(12) United States Patent
Stanek et al.

(10) Patent No.: US 8,302,006 B2
(45) Date of Patent: Oct. 30, 2012

(54) INTERACTIVE TOOLTIP TO DISPLAY AND NAVIGATE TO DIFFERENT RESOURCES OF A DATA POINT

(75) Inventors: Christopher E. Stanek, Willoughby, OH (US); Jiao Wang, Mayfield Heights, OH (US); Fabio Malaspina, Twinsburg, OH (US); Michael Silvestro, Twinsburg, OH (US); Matthew Robert Ericsson, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 994 days.

(21) Appl. No.: 11/833,319

(22) Filed: Aug. 3, 2007

(65) Prior Publication Data

US 2008/0209354 A1    Aug. 28, 2008

Related U.S. Application Data

(60) Provisional application No. 60/892,168, filed on Feb. 28, 2007.

(51) Int. Cl.
G06F 3/048 (2006.01)
(52) U.S. Cl. ........................................ 715/711; 715/764
(58) Field of Classification Search .................. 715/711, 715/764
See application file for complete search history.

(56) References Cited

U.S. PATENT DOCUMENTS

| | | | |
|---|---|---|---|
| 6,058,469 A * | 5/2000 | Baxter | 712/43 |
| 7,350,138 B1 * | 3/2008 | Swaminathan et al. | 715/234 |
| 7,430,593 B2 * | 9/2008 | Baldwin et al. | 709/223 |
| 7,475,350 B2 * | 1/2009 | Boyles et al. | 715/734 |
| 7,568,162 B2 * | 7/2009 | Gunturi et al. | 715/763 |
| 7,672,968 B2 * | 3/2010 | Bradateanu et al. | 707/807 |
| 7,680,905 B1 * | 3/2010 | Roberts et al. | 709/220 |
| 7,685,515 B2 * | 3/2010 | Braud et al. | 715/255 |
| 7,779,356 B2 * | 8/2010 | Griesmer | 715/711 |
| 7,788,302 B1 * | 8/2010 | Thakur et al. | 707/827 |
| 2002/0186257 A1 * | 12/2002 | Cadiz et al. | 345/838 |

(Continued)

FOREIGN PATENT DOCUMENTS

EP    1 582 948 A2    10/2005

OTHER PUBLICATIONS

Microsoft Windows XP Operating System, Press Release, date: Aug. 24th, 2001. Wayback machine archived date, Apr. 23, 2006 @ http://web.archive.org/web/20060423084540/http://www.microsoft.com/presspass/press/2001/aug01/08-24winxprtmpr.mspx.*

(Continued)

Primary Examiner — David Phantana Angkool
(74) Attorney, Agent, or Firm — Turocy & Watson, LLP; R. Scott Speroff; John M. Miller

(57) ABSTRACT

Systems and methodologies for viewing locations of a data point within a system are provided. A system provided herein includes a locate component that determines locations of a selected data point and a display component that displays the locations of the selected data point in a location structure, which can be displayed at a common area of display with the selected data point. In addition, a system provided herein further includes a navigation component that receives the locations of the selected data point and facilitates navigation of the area of display to a location selected from the location structure.

16 Claims, 22 Drawing Sheets

U.S. PATENT DOCUMENTS

| | | |
|---|---|---|
| 2003/0163801 A1 | 8/2003 | Thames et al. |
| 2004/0141016 A1 | 7/2004 | Fukatsu et al. |
| 2005/0028107 A1* | 2/2005 | Gomes et al. ................ 715/762 |
| 2005/0114779 A1 | 5/2005 | Griesmer |
| 2006/0136456 A1* | 6/2006 | Jacobs et al. ................ 707/101 |
| 2007/0300160 A1* | 12/2007 | Ferrel et al. .................. 715/744 |
| 2009/0094105 A1* | 4/2009 | Gounares et al. ............... 705/14 |
| 2010/0138734 A1* | 6/2010 | Braud et al. .................. 715/227 |
| 2010/0175006 A1* | 7/2010 | Li ................................ 715/764 |

OTHER PUBLICATIONS

European Search Report dated Sep. 27, 2010 for EP Application No. EP 08 10 2135, 8 pages.

* cited by examiner

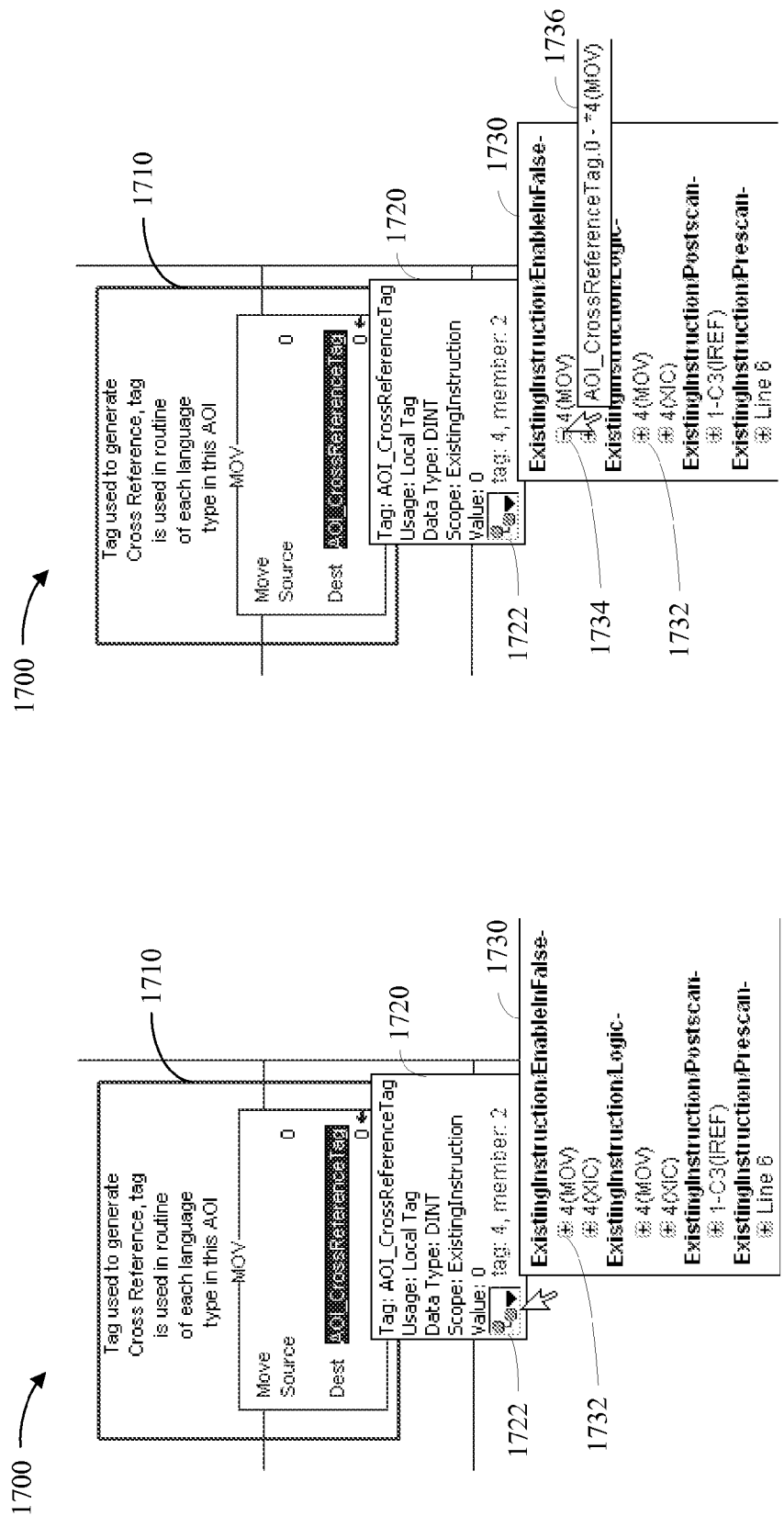

| Element | Container | */Routine | Location | Reference | BaseTag | Destructive | Description |
|---|---|---|---|---|---|---|---|
| ExistingInstruction,FBDInvocation | MyProgram | FBDInvocat... | Sheet 1, A1 | IO_Udt | | Y | A User-D... |
| IREF,EnableIn_FBD | MyProgram | FBDInvocat... | Sheet 1, A1 | IO_Udt.EnableIn | | Y | A User-D... |
| IREF,ReqIn | MyProgram | FBDInvocat... | Sheet 1, A1 | IO_Udt.RequiredInput | | Y | A User-D... |
| NestedInstruction,NestedInstruction_01 | MyProgram | FBDInvocat... | Sheet 1, C1 | IO_Udt | | Y | A User-D... |
| OREF,ReqOut | MyProgram | FBDInvocat... | Sheet 1, C3 | IO_Udt.RequiredOutput | | Y | A User-D... |
| IREF,ReqIn | MyProgram | FBDInvocat... | Sheet 3, A1 | IO_Udt.RequiredInput | | Y | A User-D... |
| ExistingInstruction,ExistingInstruction_01 | MyProgram | FBDInvocat... | Sheet 3, B1 | IO_Udt | | Y | A User-D... |
| OREF,ReqOut_1 | MyProgram | FBDInvocat... | Sheet 3, C2 | IO_Udt.RequiredOutput | | Y | A User-D... |
| ExistingInstruction | MyProgram | LadderInvo... | Rung 0 | IO_Udt | | Y | A User-D... |
| NestedInstruction | MyProgram | LadderInvo... | Rung 1 | IO_Udt | | Y | A User-D... |
| Action,Action_000 (Body) | MyProgram | SFCInvocat... | B1, Line 9 | IO_Udt | | Y | A User-D... |
| Action,Action_000 (Body) | MyProgram | SFCInvocat... | B1, Line 15 | IO_Udt | | Y | A User-D... |
| Action,Action_000 (Body) | MyProgram | SFCInvocat... | B1, Line 8 | IO_Udt | | Y | A User-D... |
| ExistingInstruction(STInvocation,ReqIn,Re... | MyProgram | STInvocation | Line 8 | IO_Udt | | Y | A User-D... |
| NestedInstruction(NestedSTInvocation,IO_... | MyProgram | STInvocation | Line 9 | IO_Udt | | Y | A User-D... |
| NestedInstruction(NestedSTInvocation,IO_... | MyProgram | STInvocation | Line 15 | IO_Udt | | Y | A User-D... |
| MOV | ExistingInstruction | EnableInFa... | Rung 4 | AOI_CrossReferenceTag.0 | | Y | Tag used... |
| XIC | ExistingInstruction | EnableInFa... | Rung 4 | AOI_CrossReferenceTag.0 | | N | Tag used... |
| MOV | ExistingInstruction | Logic | Rung 4 | AOI_CrossReferenceTag.0 | | Y | Tag used... |
| XIC | ExistingInstruction | Logic | Rung 4 | AOI_CrossReferenceTag | | N | Tag used... |
| IREF,AOI_CrossReferenceTag | ExistingInstruction | Postscan | Sheet 1, C3 | AOI_CrossReferenceTag | | N | Tag used... |
| AOI_CrossReferenceTag := 0; | ExistingInstruction | Prescan | Line 6 | AOI_CrossReferenceTag | | Y | Tag used... |

INTERACTIVE TOOLTIP TO DISPLAY AND NAVIGATE TO DIFFERENT RESOURCES OF A DATA POINT

CROSS REFERENCE

This application claims the benefit of U.S. Provisional Patent Application Ser. No. 60/892,168 filed on Feb. 28, 2007, entitled "INTERACTIVE TOOLTIP TO DISPLAY AND NAVIGATE TO DIFFERENT RESOURCES OF A DATA POINT," the entirety of which is incorporated herein by reference.

TECHNICAL FIELD

The following description generally to industrial system automation, and more particularly to programming and debugging logic for an industrial system.

BACKGROUND

Advancements in technology have allowed many modern factories to be run by industrial control systems. These industrial control systems increase the efficiency of the factory, thereby reducing costs associated with the factory and allowing these reduced costs to be passed on to a consumer. To further the automation of a factory and increase cost savings, many industrial control systems employ programmable logic controllers (PLCs), which can be coupled to various machines in an industrial system and control a process that requires precise timing between actions of those machines. Programmable logic controllers thus increase the speed and efficiency with which an industrial process can be performed and reduce or even eliminate the costs incurred in an industrial process traditionally associated with human error.

Systems and methodologies for designing the control logic utilized by PLCs and programming this control logic onto the PLCs have been developed and implemented in various industrial settings. Recently, software tools have been implemented to facilitate PLC programming. With the aid of software tools, a user can program a PLC to perform a desired industrial process by creating and implementing control logic for manipulating a series of data points that are representative of the industrial system. These data points correspond to, for example, inputs and outputs of physical entities in an industrial system and signals internal to a PLC. Often, however, the number of data points used in the control logic for an industrial system can be quite substantial. In addition, individual data points often appear in multiple locations within a given set of control logic. This complicates debugging control logic associated with a particular data point because where or how a particular data point is impacting the control logic may not be immediately apparent to the user.

Conventional software tools have attempted to address these problems by displaying a separate reference window containing the locations of each data point in the control logic. In order to view this reference window, however, a user of a conventional software tool must leave the logic he is currently programming and/or debugging. This, in turn, causes the user to break his workflow and thought processes. In addition, the reference window often covers up the current control logic, making viewing both the reference window and the current control logic simultaneously impracticable. Further, because the reference window displays the locations of all data points within the control logic, a user is often required to spend unnecessary time sorting through all of the given information in order to find the locations of the particular data point of interest.

Alternatively, other conventional software tools provide means for a user to generate a printout containing reference information for each data point within the control logic. Generating a printout of reference information, however, requires a user to spend unnecessary time to generate and collect the printout. Additionally, once the printout is obtained, the user is required to manually go through the printout, sort through the printout to find the information relevant to the particular data point of interest, and go to each location in the control logic listed within the printout.

In view of at least the above, there exists a need in the art for a system and/or methodology that provides more efficient visualization and navigation for a set of information within a software tool.

SUMMARY

The following presents a simplified summary of the claimed subject matter in order to provide a basic understanding of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and/or methodologies are presented herein for viewing locations of a data point within a set of logic and other reference information particular to the data point in a common display area with the corresponding set of logic. Further, systems and/or methodologies are provided for navigating to a location within the set of logic selected from the displayed locations of the data point. Benefits of the provided systems and/or methodologies include the ability to find and debug data points within a set of logic without obscuring the logic from view, thereby preventing the workflow and thought processes of a logic programmer from being disturbed. Further, because the displayed locations and reference information are particularized for a single data point, the need to go through a potentially long list of all data points within a set of logic is eliminated.

In one example, a software tool can be used for programming a set of logic having one or more data points. The set of logic is displayed in a display area within the software tool. When a user selects one the data points from within the set of logic, the system displays locations of the selected data point within the current set of logic in the same display area as the logic. In accordance with one aspect of the present invention, the system further facilitates navigation of the display area to a location selected by the user from the location display. Alternatively, the system can display a menu comprising an information region and a control region in a display area shared with the corresponding set of logic. The information region of the menu can show basic information about a selected data point, and the control region, once engaged by the user, can expand the menu to show the locations of the selected data point within the corresponding set of logic. Additionally, detailed reference information corresponding to a selected location on the menu can be displayed in the same display area as the menu and the corresponding set of logic.

In another example, the system displays locations of a data point within a set of logic by creating or expanding a tooltip corresponding to the data point within the software tool. A user can hover over a data point to display a tooltip containing locations of the data point within the current set of logic. The user can then hover over the tooltip to continue viewing the locations or move away from the tooltip to remove the locations from the display area. The system can also facilitate navigation of the display area to a location selected by the user from the tooltip. In yet another example, the system can determine whether sufficient display space exists to display locations of a selected data point in a tooltip. Upon a negative determination, a tooltip can be created and displayed having only a subset of the locations. To allow a user to view additional locations of the selected data point, a button or other suitable control area can be provided that can navigate the user to a reference window for more complete information.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

BRIEF DESCRIPTION OF THE DRAWINGS

FIGS. 17A-D comprise illustrations of exemplary reference information for a data point that can be provided by a software tool in accordance with aspects described herein.

FIGS. 18-19 are illustrations of expandable tooltips for a data point that can be provided by a software tool within user interfaces for browsing data points.

FIG. 21B illustrates a reference window that can be employed by a software tool to provide further reference information regarding a data point.

DETAILED DESCRIPTION

Figure 1:
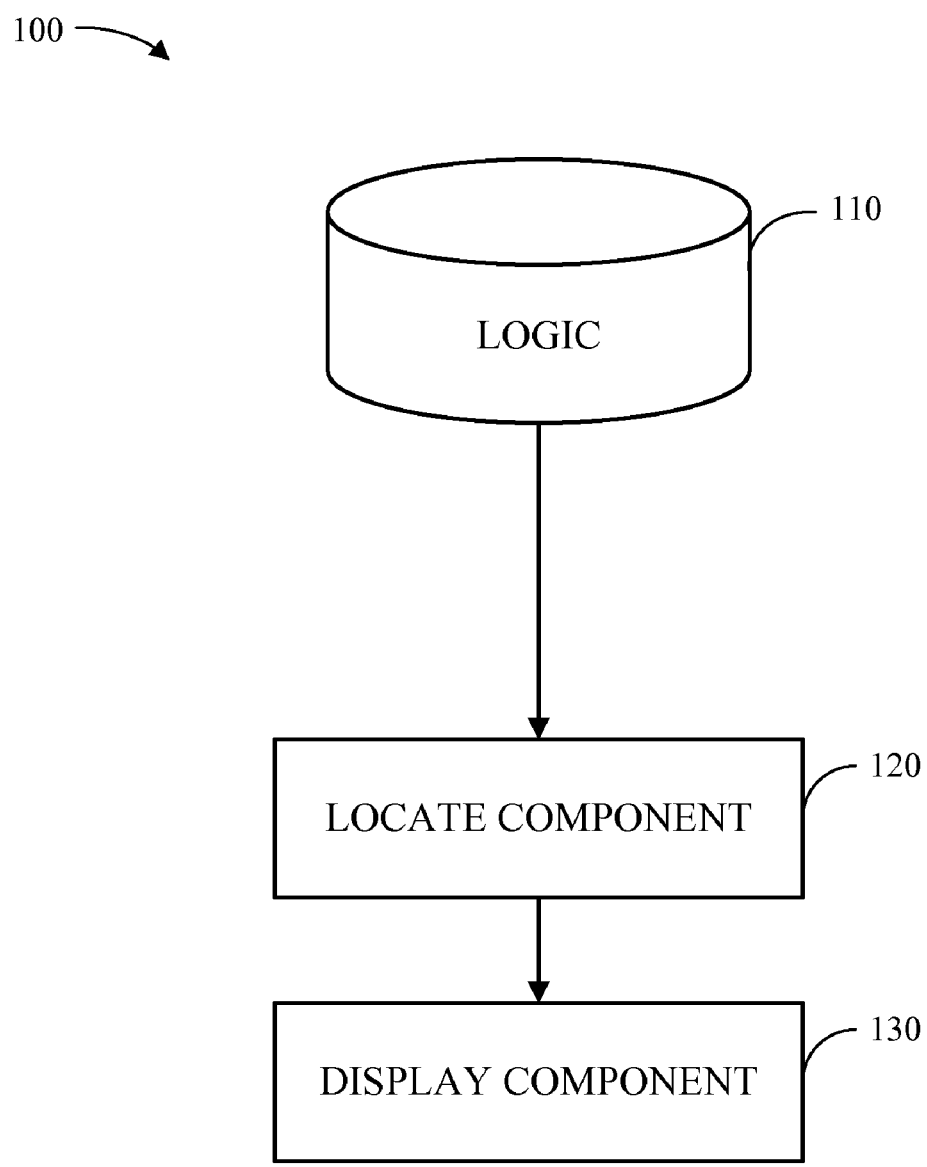
FIG. 1 is a block diagram of a system that facilitates viewing locations of a data point within a set of logic in a common display area with the corresponding set of logic.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, while the following description generally relates to software tools for logic programming, those skilled in the art will recognize that the embodiments described herein can be applied to any software application that utilizes one or more objects that are referenced in multiple locations. It is to be appreciated that the systems and/or methods described herein can be employed with any suitable type of software tool and all such types of software tool(s) are intended to fall within the scope of the hereto appended claims.

Referring now to the drawings, FIG. 1 illustrates a high-level overview of a system 100 that facilitates viewing locations of a data point within a set of logic 110 in a common display area with the corresponding set of logic 110. The system includes a locate component 120 that determines the locations of a particular data point within a set of logic and a display component 130 that displays the locations of the data point in a common area of display with the corresponding set of logic 110.

In one example, the system 100 is employed in a software tool for programming control logic used by a PLC in an industrial automation system. In conventional software tools, a user is required to either refer to a separate reference window or a printout in order to view locations of a data point within a set of logic. In contrast, the system 100 provides a mechanism for viewing locations of a data point in the same window display area of the software tool as the set of logic currently being programmed or debugged without obscuring the set of logic or disturbing the workflow or thought processes of a user. Additionally, because the locations of only a particular data point within a set of logic are displayed, the need to go through a list of all data points is eliminated.

In another example, the system 100 is employed via tooltips associated with a data point within a set of logic 110 as represented on a display of a software tool. Once the locate component 120 determines the locations of a particular data point within a set of logic, the display component 130 displays the locations of the data point in a tooltip associated with the data point. In accordance with alternative aspects, the display component 130 can either create a tooltip for the data point for location information or extend an existing tooltip corresponding to the data point by including the location information within the existing tooltip.

It is to be appreciated that the system 100, as well as all other systems and methodologies herein disclosed and/or claimed, can be utilized in all portions of a software tool that facilitates any suitable mode of programming. By way of specific example, certain aspects described herein can be utilized in connection with programming a set of logic, creating add-on instructions, or organizing and/or editing data points. In addition, various aspects described herein can be utilized for all methods of logic programming, which include but are not limited to ladder logic (LL), function block diagram (FBD), structured text (ST), and sequential function chart (SFC) methods. It is to be appreciated that any suitable portion of a software tool that facilitates software programming, such as logic programming, and any method of programming are intended to fall within the scope of the hereto appended claims.

Figure 2:
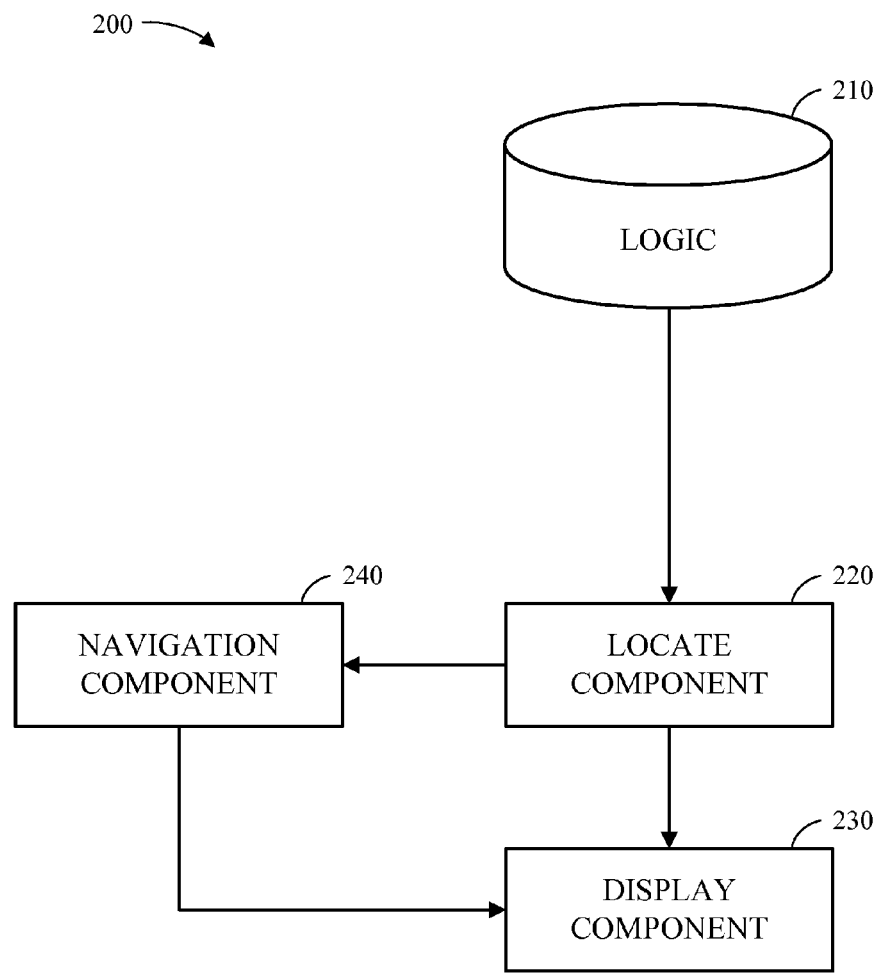
FIG. 2 is a block diagram of a system that facilitates viewing locations of a data point within a set of logic in a common display area with the corresponding set of logic and navigating the display area to a selected location of the data point.

Referring to FIG. 2, a high-level overview of a system 200 that facilitates viewing locations of a data point within a set of logic 210 in a common display area with the corresponding set of logic 210 and navigating the display area to a selected location of the data point is illustrated. In one example, the system includes a locate component 220 that finds the locations of the data point within the set of logic 210, a display component 230 that displays the locations of the data point in a common area of display with the corresponding set of logic 210, and a navigation component 240 that receives the locations of the data point from the locate component 220 and instructs the display component 230 to navigate the area of display to a selected location.

In accordance with one aspect, the system 200 is employed in the context of a software tool for programming control logic used by a PLC in an industrial automation system. In conventional software tools, a user is required to navigate to locations of a data point either manually or via an external cross-references window. The system 200 allows a user to navigate to locations of a data point from a window containing a set of logic a user is currently programming or debugging, thereby preventing the obscuring of the current logic or disturbing the workflow and/or thought processes of the user.

In another example, the system 200 can be employed via tooltips associated with a data point within a set of logic 210 as represented on the display of a software tool. In accordance with alternative aspects, the display component 230 can either create a tooltip for the data point for location information or extend an existing tooltip corresponding to the data point by including the location information within the existing tooltip. Once the tooltip is displayed, a user can then select a location of a data point listed on the tooltip to navigate the current display to that location. In accordance with one aspect, the locations can be displayed within the tooltip as HTML hyperlinks that are selectable by the user.

Figure 3:
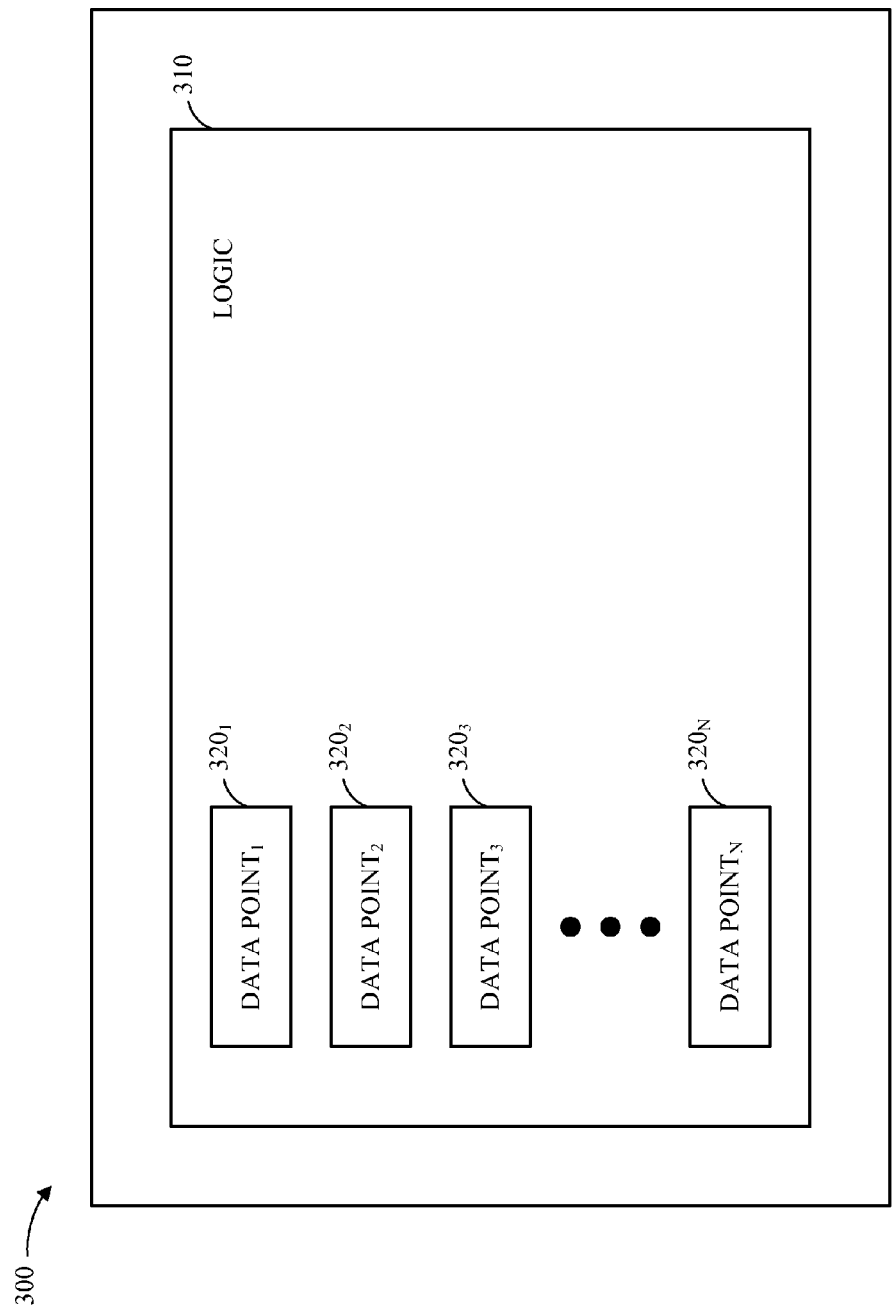
FIG. 3 is a diagram of a user interface displaying a set of logic having one or more data points.

Next, referring briefly to FIG. 3, a user interface 300 for a software tool that facilitates logic programming is illustrated. In this example, a programming display 310 is displayed in the user interface 300. The programming display 310 can display, for example, a set of logic having one or more data points 320.

Figure 4:
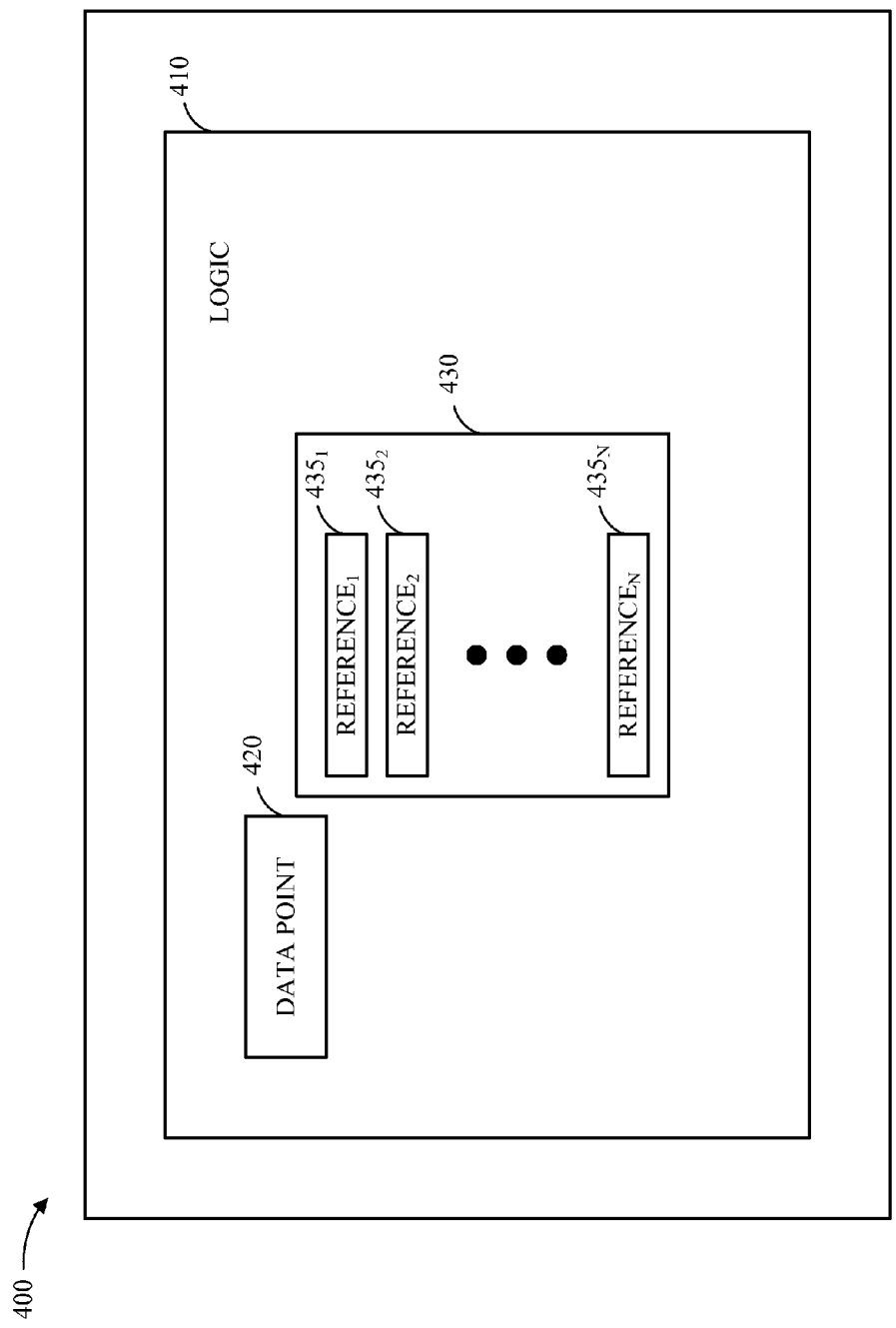
FIG. 4 is a diagram of an exemplary user interface in accordance with an aspect described herein.

Turning to FIG. 4, an exemplary user interface 400 in accordance with an aspect of the present invention is illustrated. The user interface 400 includes, for example, a window 410 containing at least one data point 420 that corresponds to a set of logic. Additionally, the user interface includes a location structure 430 that contains references 435 to the locations of the data point 420 in the corresponding set of logic. In one example, the location structure 430 is displayed in the window 410 in the same display area as the corresponding set of logic. In another example, one of the references 435 can be selected by the user in order to navigate the window 410 to the location of the current set of logic corresponding to the selected reference.

Figure 5A:
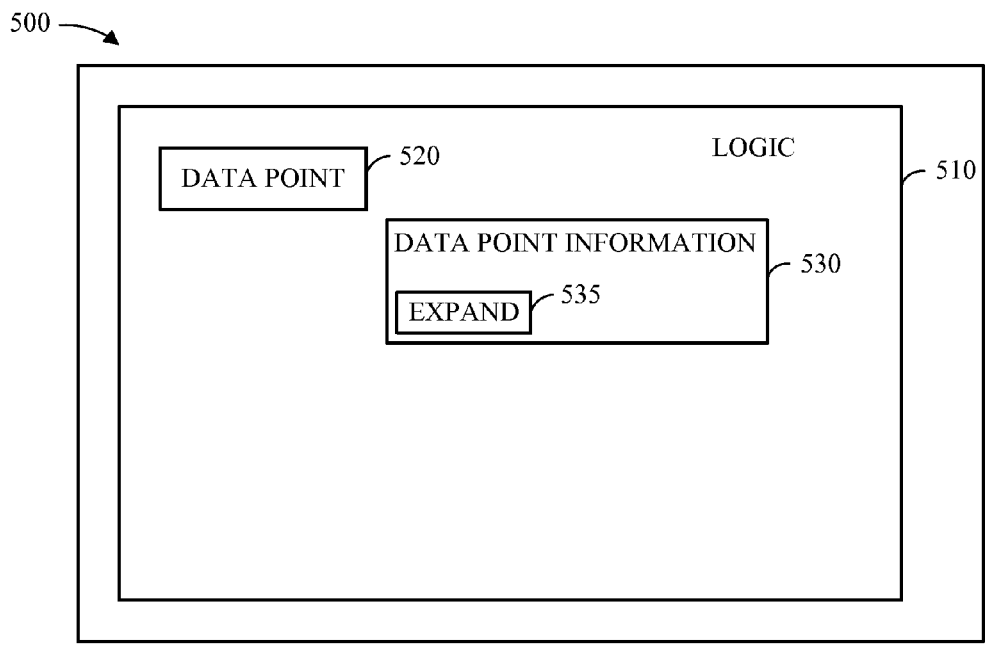
FIGS. 5A-B comprise diagrams of an exemplary user interface in accordance with an aspect described herein.
Figure 5B:
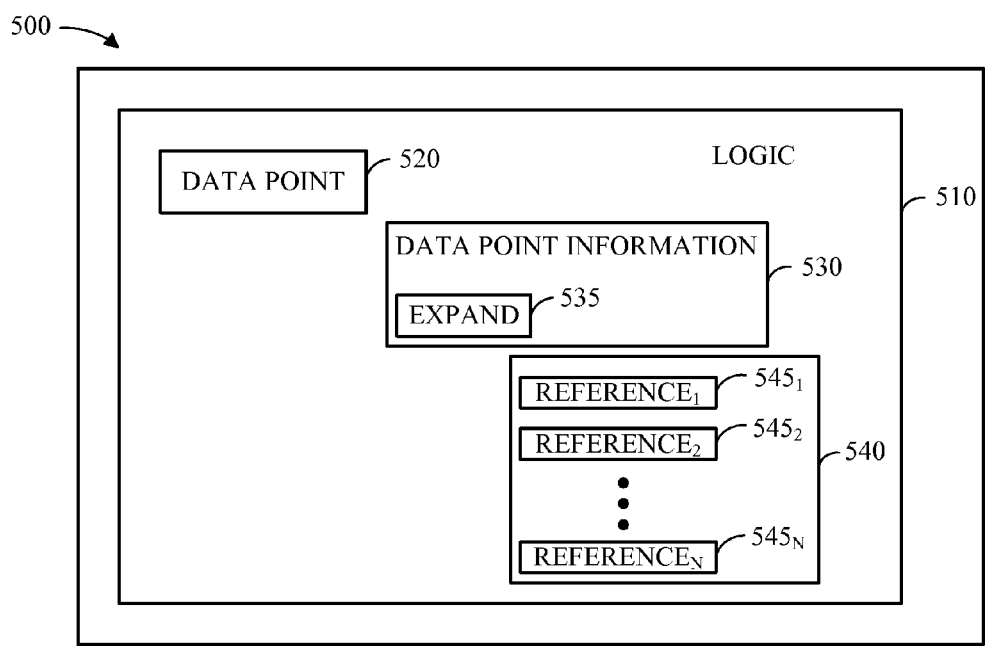

Referring to FIGS. 5A-B, an exemplary user interface 500 is illustrated. The user interface 500 can include, for example, a window 510 containing at least one data point 520 that corresponds to a set of logic. Additionally, the user interface can include an information structure 530 that contains a menu for displaying basic information about the data point. The menu contained in the information structure 530 can also include a control region 535, which can be engaged by a user to expand the information structure 530 to include the locations of the data point 520. It is to be appreciated that the control region 535 can be a button or any other suitable structure for obtaining user input and that the control region 535 can be engaged by clicking or hovering over the control region 535 or any other suitable method for engaging the control region 535. It is to be further appreciated that any suitable control region structure and any suitable method for engaging the control region is intended to fall within the scope of the hereto appended claims. FIG. 5A illustrates the state of the user interface 500 and window 510 prior to the control region 535 of the information structure 530 being engaged by a user. In one example, the information structure 530 is displayed in a window 510 within the user interface 500 in the same display area as the corresponding set of logic.

FIG. 5B illustrates a state of the user interface 500 and window 510 after the control region 535 of the information structure 530 has been engaged by a user. Once the control region 535 of the information structure 530 has been engaged, a location structure 540 is displayed that contains references 545 to locations of the data point 520 within the corresponding set of logic. In one example, the location structure 540 is appended to the information structure 530 to form a single expanded structure (not shown). Alternatively, the location structure 540 is displayed independently of the information structure 530. In one example, the information structure 530 and/or location structure 540 can be displayed in a window 510 within the user interface 500 in the same display area as a corresponding set of logic. In another example, a reference 545 can be selected by the user in order to navigate the window 510 to the location of the current set of logic corresponding to the selected reference.

Figure 6:
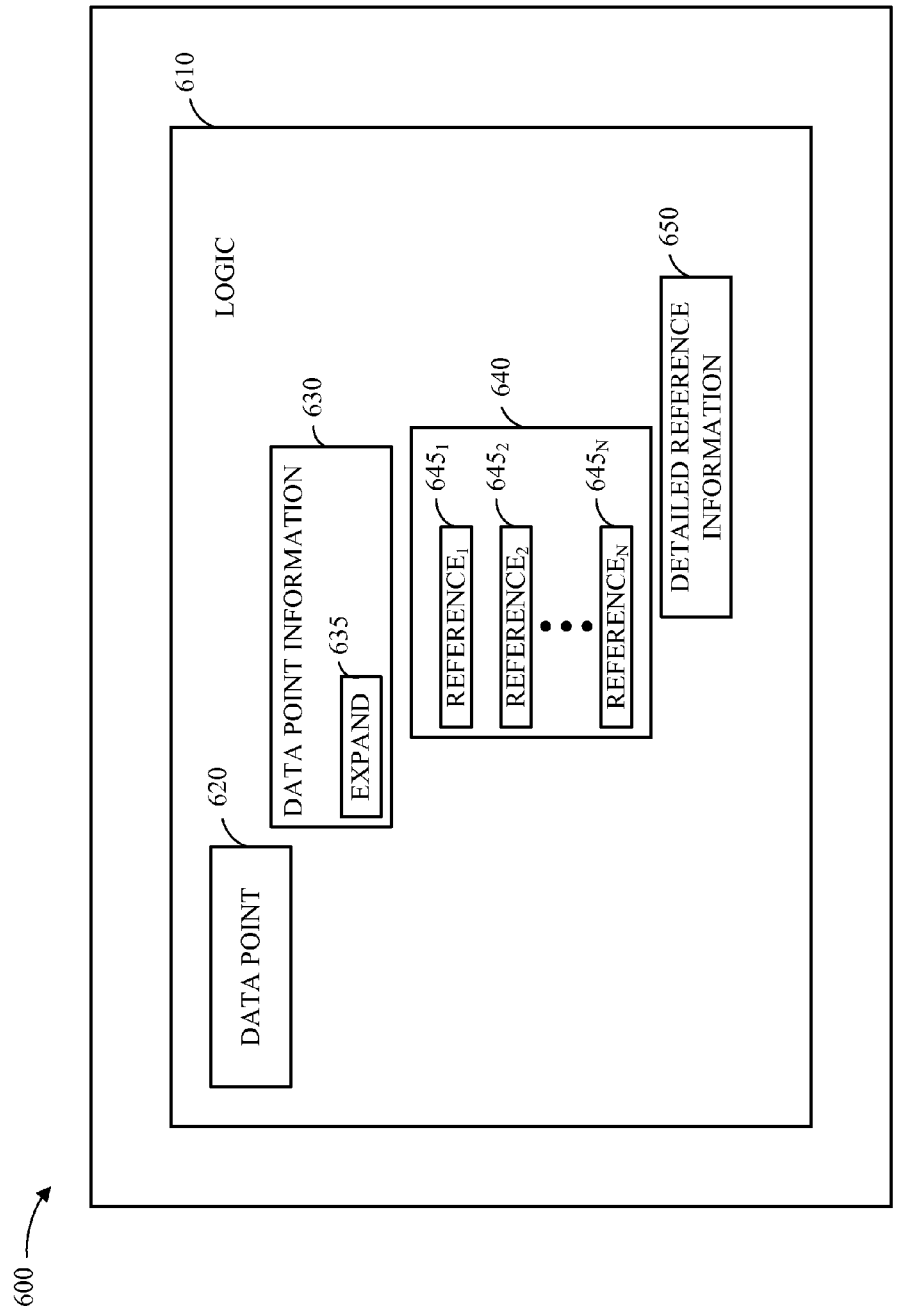
FIG. 6 is a diagram of an exemplary user interface in accordance with an aspect described herein.

Turning to FIG. 6, another exemplary user interface 600 is illustrated. The user interface 600 can include, for example, a window 610 containing at least one data point 620 that corresponds to a set of logic. Similar to the user interface 500 and window 510 illustrated in FIG. 5, the window 610 can contain an information structure 630 having a control region 635 and a location structure 640. The location structure 640 can contain references 645 to locations of the data point within the corresponding set of logic. In one example, a reference 645 can be engaged to display detailed information 650 regarding the reference 645. A reference 645 can be engaged to display detailed information 650, for example, by hovering over the reference 645. Additionally and/or alternatively, a reference 645 in the location structure 640 and/or corresponding detailed reference information 650 can be engaged by the user to navigate the window 610 to the location of the current set of logic corresponding to the reference 645. Accordingly, a reference 645 in the location structure 640 can be configured to display detailed information 650 in response to a first mode of engagement and to facilitate navigation of the window 610 to a location corresponding to the reference 645 in response to a second mode of engagement. By way of non-limiting example, a user can hover over a reference 645 to display detailed information 650 corresponding to the reference 645 and/or click the reference 645 to navigate the window 610 to a location corresponding to the reference 645.

Figure 7:
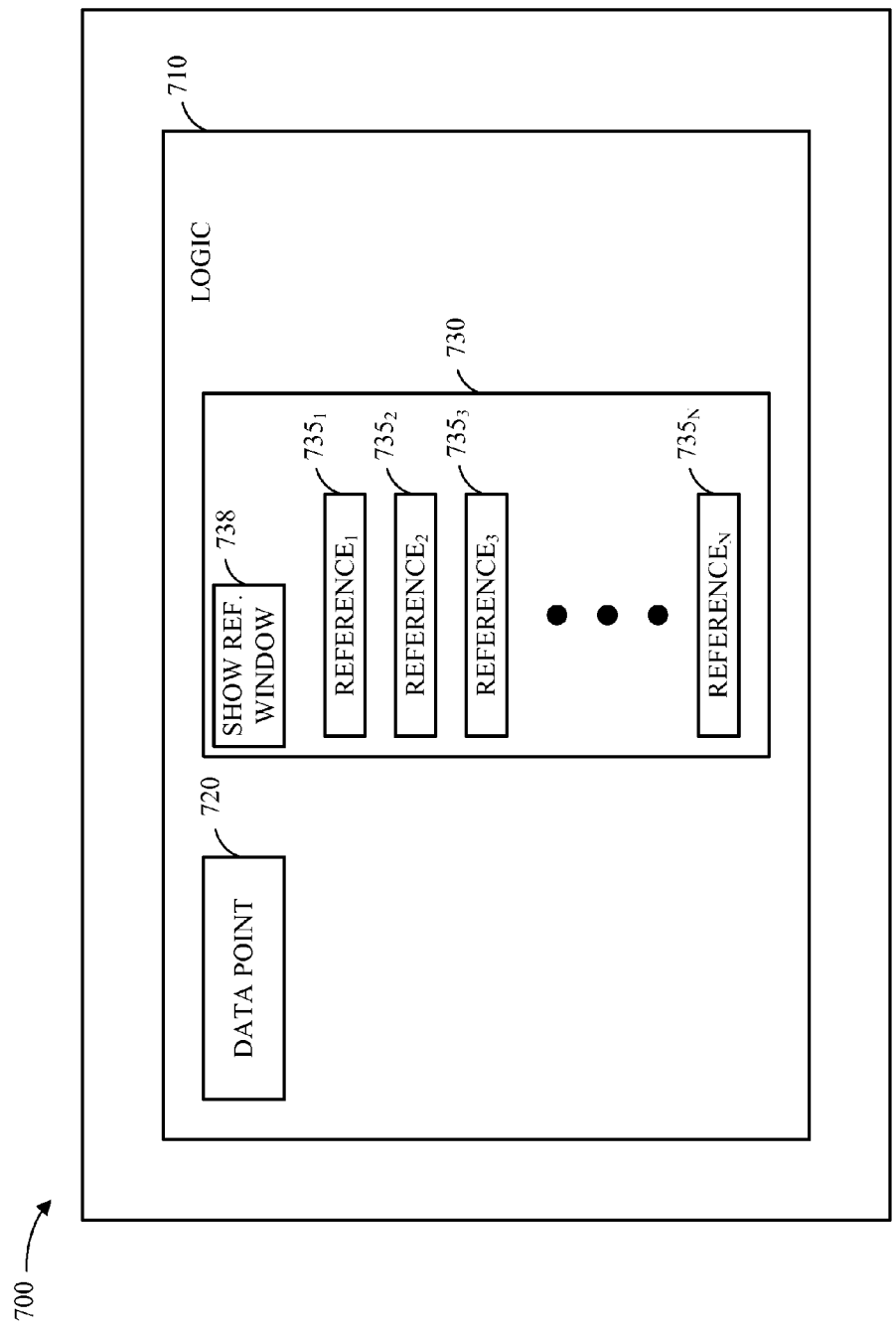
FIG. 7 is a diagram of an exemplary user interface in accordance with an aspect described herein.

Referring to FIG. 7, an additional exemplary user interface 700 is illustrated. The user interface 700 can include, for example, a window 710 containing at least one data point 720 that corresponds to a set of logic. Additionally, the user interface 700 can include a location structure 730 that contains references 735 to the locations of the data point 720 in the corresponding set of logic. In one example, the location structure 730 is displayed in the window 710 in the same display area as the corresponding set of logic. Additionally, the location structure 730 can determine whether there is enough space in the window 710 to display a given set of references 735 corresponding to the data point 720. If the location structure 730 determines that there is not enough room in the window 710, the location structure 730 can instead display a subset of the references 735 along with a control region 738. The control region 738, when engaged by a user, can direct the user to an external reference window (not shown) within the user interface 700 for more complete information about the data point 720. Alternatively, the control region 738 can facilitate scrolling through a set of references 735 corresponding to the data point 720 within the location structure 730 upon being engaged by a user. It is to be appreciated that the control region 738 can be a button, a scroll bar, or any other suitable structure for obtaining user input and that the control region 738 can be engaged by clicking or hovering over the control region 738 or any other suitable method for engaging the control region 738. It is to be further appreciated that any suitable control region structure and any suitable method for engaging the control region is intended to fall within the scope of the hereto appended claims.

Figure 8A:
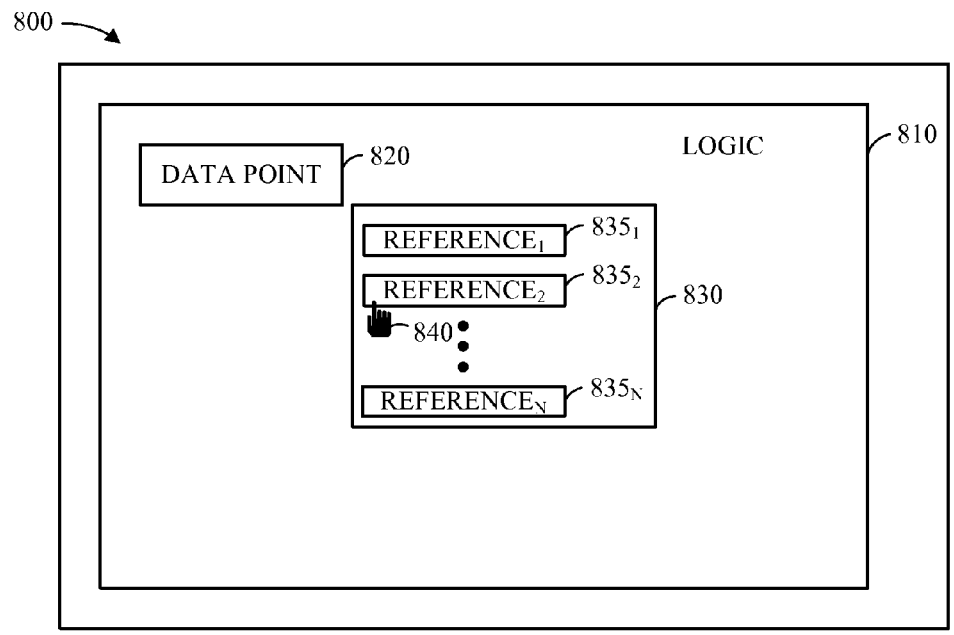
FIGS. 8A-B comprise diagrams of an exemplary user interface in accordance with an aspect described herein.
Figure 8B:
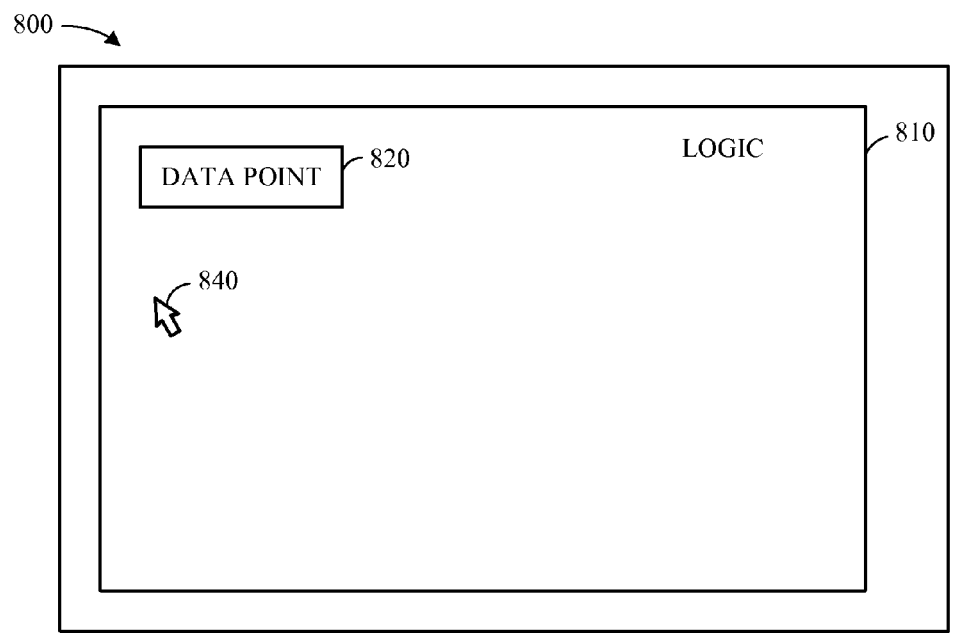

Next, referring to FIGS. 8A-B, a further exemplary user interface 800 is illustrated. The user interface 800 can include, for example, a window 810 containing at least one data point 820 that corresponds to a set of logic. The user interface 800 can further include a location structure 830 containing references 835 that correspond to the locations of a data point 820 within the corresponding set of logic. In one example, the location structure 830 can be employed as a tooltip associated with the data point 820. References 835 within the location structure 830 can then be selected by a user by manipulating an input device (not shown) corresponding to a cursor 840 within the user interface 800. In another example, selecting one of the references 835 can cause the window 810 to navigate to the location of the current set of logic corresponding to the selected reference. In yet another example, references 835 within the location structure 830 can be HTML hyperlinks that are selectable by a user. The cursor 840 can change appearance when it is pointing to a reference 835 within the location structure 830 to indicate to a user that a reference 835 can be selected.

FIG. 8A illustrates a state of the user interface 800 while the cursor 840 remains within a predetermined distance of location structure 830. In the example illustrated by FIG. 8A, the location structure 830 is in the form of a tooltip corresponding to a data point 820. In contrast, FIG. 8B illustrates a state of the user interface when the cursor 840 is moved outside of a predetermined distance from the location structure 830. As illustrated by FIG. 8B, the location structure 830 can removed from the user interface 800 when the cursor 840 is moved away from the location structure 830.

Figure 9:
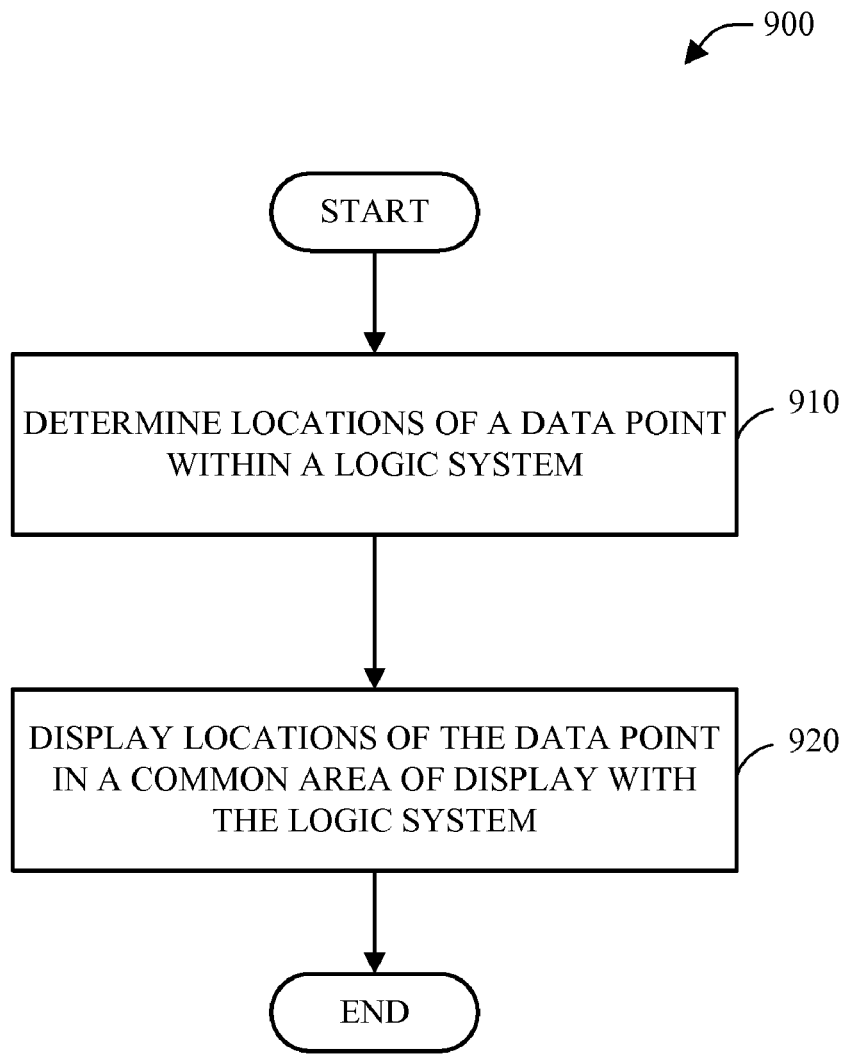
FIG. 9 is a flowchart of a method that facilitates viewing locations of a data point within a set of logic in a common display area with the corresponding set of logic.
Figure 10:
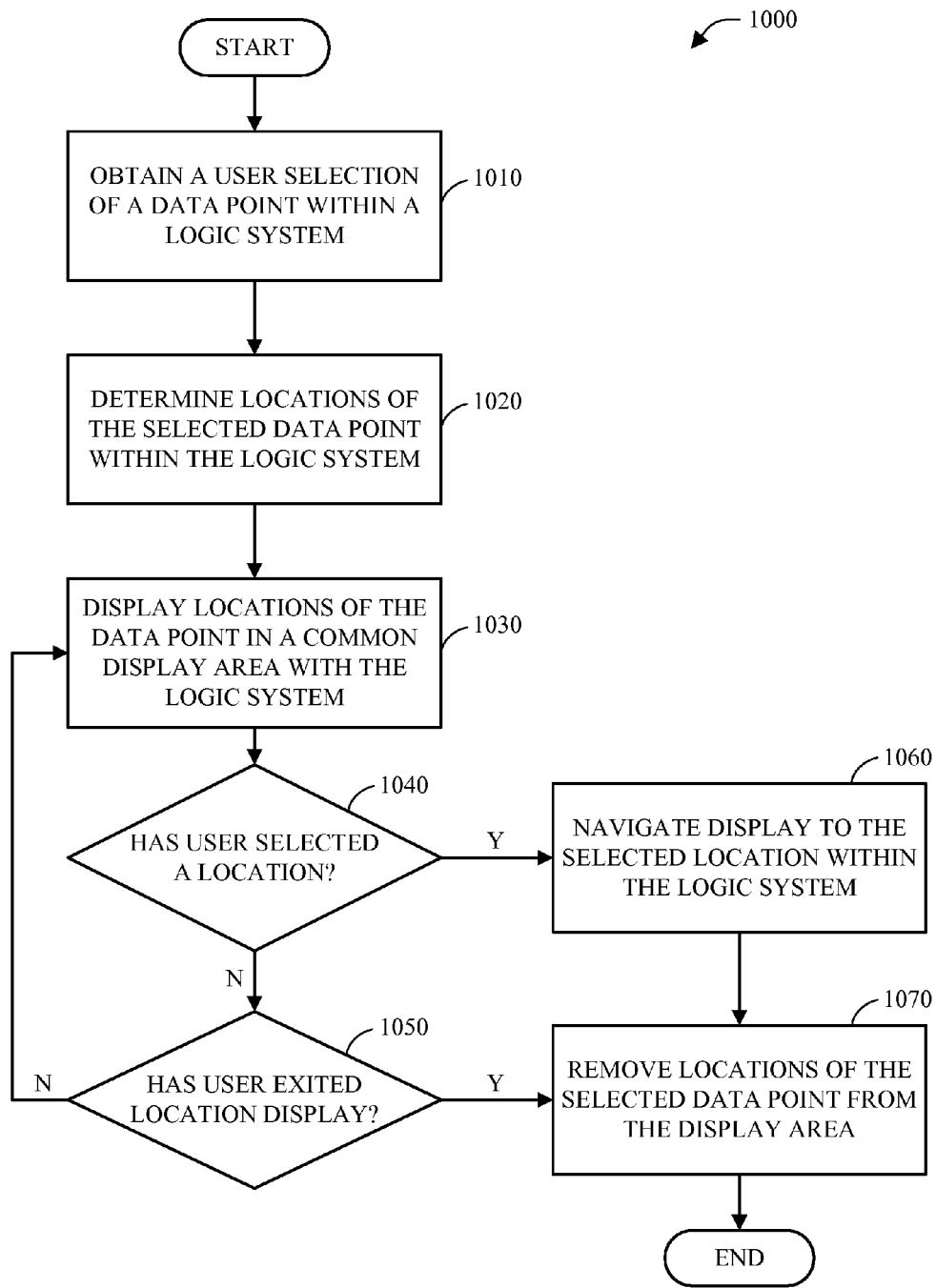
FIG. 10 is a flowchart of a method that facilitates viewing locations of a data point within a set of logic in a common display area with the corresponding set of logic and navigating the display area to a selected location of the data point.

Turning to FIGS. 9-10, methodologies that may be implemented in accordance with features presented herein are illustrated via series of acts. It is to be appreciated that the methodologies claimed herein are not limited by the order of acts, as some acts may occur in different orders, or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as claimed herein.

Referring to FIG. 9, a method 900 that facilitates viewing locations of a data point within a set of logic in a common display area with the corresponding set of logic is illustrated. At 910, locations of a data point within a logic system are determined (e.g., by a locate component 120). At 920, locations of the data point are displayed in a common area of display with the logic system (e.g., by a display component 130).

Next, referring to FIG. 10, a method 1000 that facilitates viewing locations of a data point within a set of logic in a common display area with the corresponding set of logic and navigating the display area to a selected location of the data point is illustrated. At 1010, a user selection of a data point within a logic system is obtained. At 1020, locations of the selected data point within the logic system are determined (e.g., by a locate component 220). At 1030, locations of the data point are displayed in a common area of display with the logic system (e.g., by a display component 230).

At 1040, it is determined whether the user has selected a location from among the locations displayed at step 1030. If the user has selected a location, the method proceeds to step 1060, wherein the display is navigated to the selected location within the logic system (e.g., by a navigation component 240). At 1070, the locations of the selected data point are removed from the display area.

If the user has not selected a location at step 1040, the method instead proceeds to step 1050. At 1050, it is determined whether the user has exited the location display. If the user has exited the location display, the method proceeds to step 1070 wherein the locations of the selected data point are removed from the display area. If the user has not exited the location display, the method returns to step 1030 and waits for further user input.

Referring now to FIGS. 11-21, specific, non-limiting examples of implementations of various aspects of the claimed subject matter are illustrated. It should be appreciated that the examples illustrated in FIGS. 11-21 are only a subset of the possible implementations of the claimed subject matter and that other implementations are possible. Further, it should be appreciated that all such implementations are intended to fall within the scope of the subject specification, including the hereto appended claims.

Figure 11:
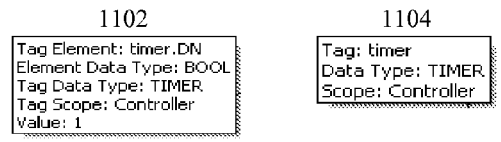
FIG. 11 illustrates tooltips that can be employed by a software tool in connection with a data point.

Referring to FIG. 11, tooltips 1102-1104 that can be employed by a software tool for logic programming are illustrated. In one example, respective tooltips 1102-1104 can be maintained and displayed for data points (e.g., data points 320) in a set of logic that is programmable by the software tool. A tooltip 1102 and/or 1104 can be displayed by, for example, hovering over a selected data point in the set of logic with a cursor for a predetermined amount of time. Once displayed, tooltips 1102-1104 can then display basic information about the data point. For example, a tooltip 1102 and/or 1104 can display the name of a data point (or "tag"), the type of a data point, (e.g., integer, Boolean, etc.), the scope of a data point within a given set of logic, the value of a data point, and/or other appropriate information.

Figure 12:
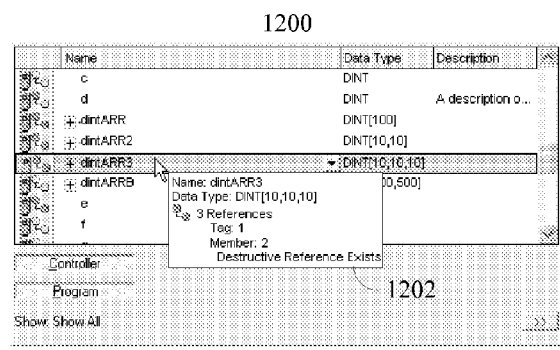
FIG. 12 illustrates a user interface for browsing data points that can be employed by a software tool.

Turning to FIG. 12, a user interface 1200 for browsing data points in a set of logic that can be provided by a software tool is illustrated. In accordance with one aspect, the user interface 1200 can contain a list of data points within a set of logic that is programmable by the software tool to facilitate browsing or editing of the data points. A user can then select a data point from the list provided by the user interface 1202 by, for example, hovering over or clicking on the name of a data point in the list. Once a data point from the list is selected, a tooltip 1202 can be displayed that corresponds to the selected data point. In one example, the tooltip 1202 can display basic reference information about the data point in a similar manner to tooltips 1102 and 1104. In addition, the tooltip 1202 can display information regarding the number and type of references to a selected data point in a set of logic.

Figure 13:
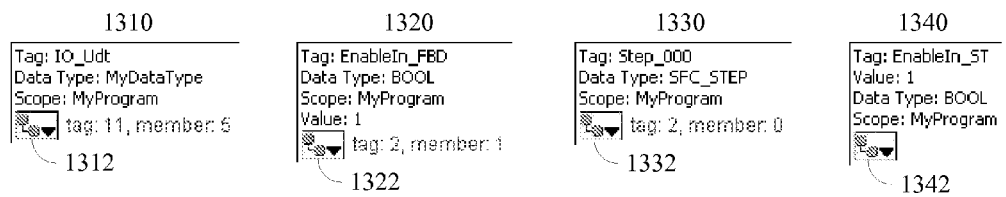
FIG. 13 illustrates exemplary expandable tooltips for a data point in accordance with various aspects described herein.

Referring to FIG. 13, exemplary expandable tooltips 1310, 1320, 1330, and 1340 that can be provided for a data point by a software tool for logic programming in accordance with various aspects described herein are illustrated. In accordance with one aspect, an expandable tooltip 1310, 1320, 1330, and/or 1340 can be provided by a software tool for logic programming in a common window area of display (e.g., a common window 310) with logic currently being programmed using the software tool. In the specific, non-limiting examples illustrated in FIG. 13, tooltip 1310 can be displayed for a data point in connection with relay ladder logic (RLL) programming and can include a name, data type, program scope, and/or description of a data point. Further, tooltip 1320 can be displayed for a data point in a function block diagram (FBD) programming display and can include a name, data type, program scope, value, and/or description of a data point. In addition, tooltip 1330 can be used to display information for a data point currently being used for sequential function chart (SFC) programming and can include a name, data type, program scope, and/or description of a data point. Finally, tooltip 1340 can display information for a data point being utilized in programming a set of logic via structured text (ST) and can include a name, value, data type, program scope, and/or description of a data point.

In accordance with another aspect, the tooltips 1310, 1320, 1330, and 1340 can respectively include control regions (e.g., control regions 535) in the form of buttons 1312, 1322, 1332, and 1342. In one example, a button 1312, 1322, 1332, or 1342 can be engaged by a user by, for example, clicking or hovering over the button with a cursor, to bring up a cross reference sub-tooltip that lists cross-reference information for the subject data point of the respective tooltip. In another example, tooltips 1310, 1320, 1330, and/or 1340 can display a summary line adjacent to their respective buttons 1312, 1322, 1332, and/or 1342, which can provide information regarding the number of existing cross references for their respective data point(s) and/or members of the respective data point(s). As illustrated by tooltip 1340, a summary line can be disabled and not shown if a subject data point has no cross references.

Figure 14A:
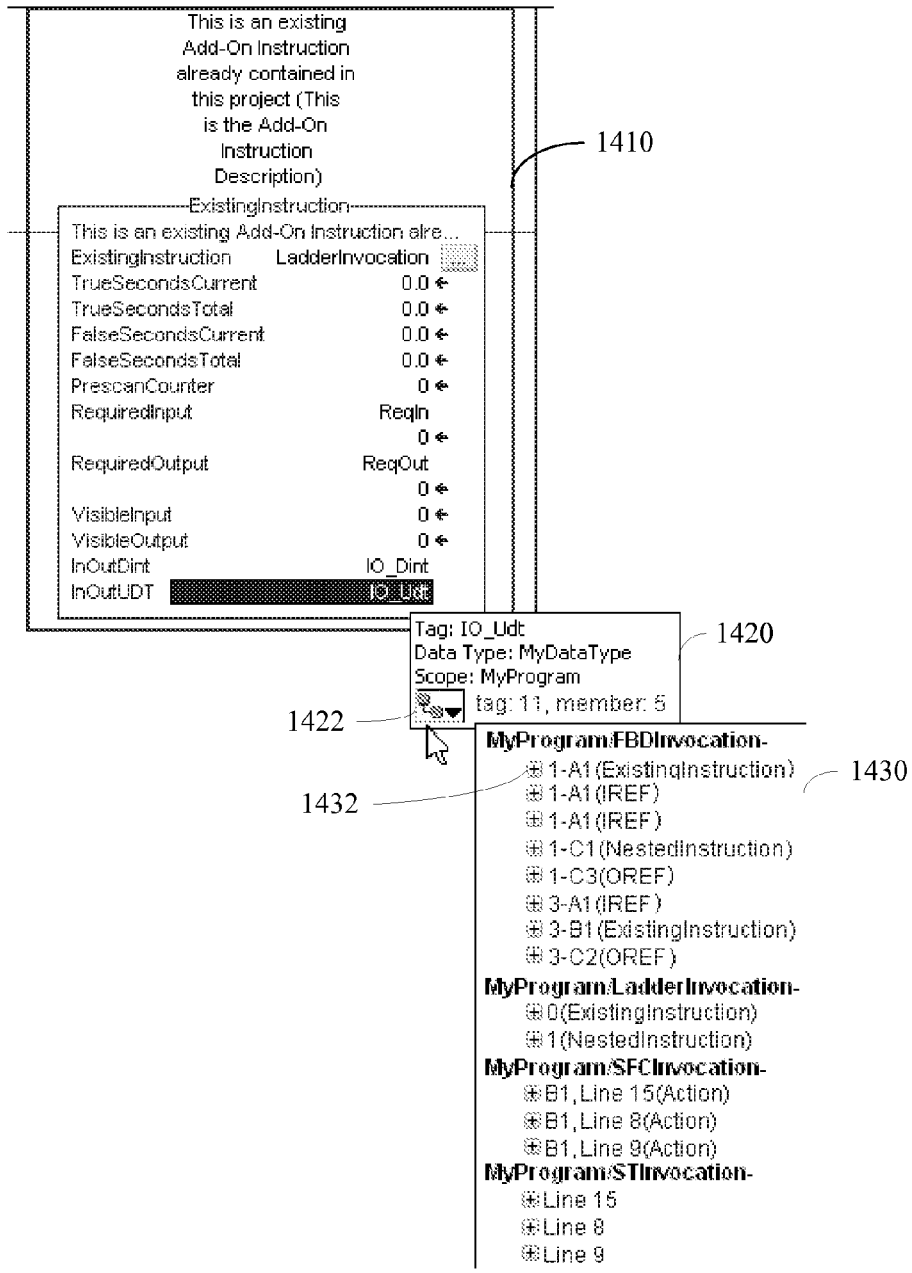
FIGS. 14A-B illustrate exemplary reference information for a data point that can be provided by an extended tooltip in accordance with an aspect described herein.
Figure 14B:
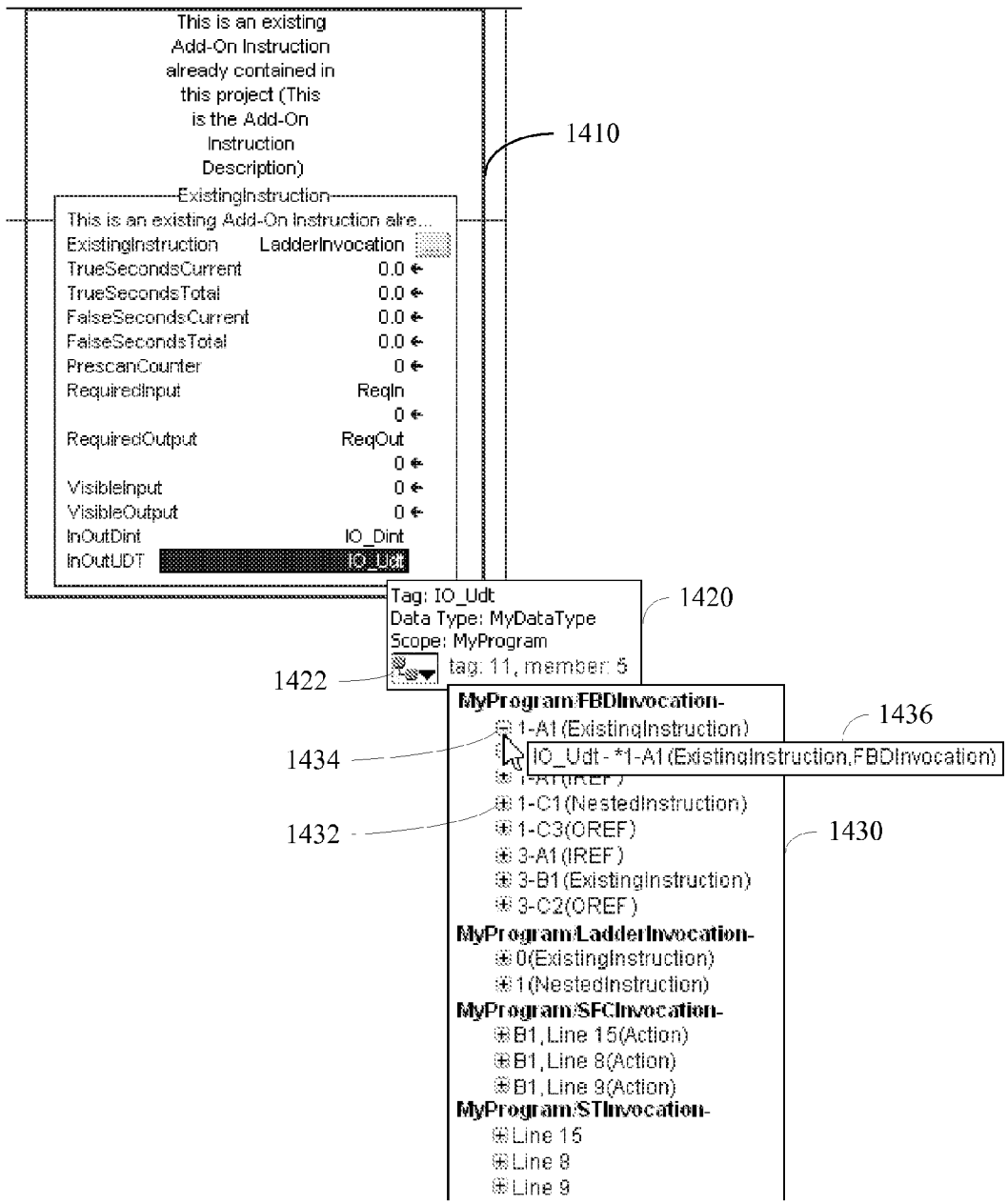

Referring now to FIGS. 14A-B, exemplary reference information for a data point that can be provided by a tooltip 1420 is illustrated. In one example, an extendable tooltip 1420 can be provided for a data point selected by a user from a programming display 1410 within a software tool for logic programming. In a similar manner to the tooltips illustrated in FIG. 13, the tooltip 1420 can contain basic information about the selected data point from the programming display 1410 as well as an expansion button 1422 that can be engaged to display cross reference information for the selected data point. In another example, cross references to a selected data point and/or elements or members of a selected data point can be located (e.g., by a locate component 120), and the number of located references can be displayed in a summary line adjacent to the expansion button 1422 in a similar manner to the expandable tooltips illustrated in FIG. 13.

In accordance with one aspect, the expansion button 1422 can be engaged by a user to display a sub-tooltip 1430 (e.g., via a display component 130) that contains cross references for the selected data point. In one example, cross references corresponding to locations in a common area of a set of logic, such as a common container or routine, can be arranged as a group in the sub-tooltip 1430. Additionally, group names can be made bold in the sub-tooltip 1430 to differentiate the group names from normal references. Each reference in the sub-tooltip 1430 can include, for example, a location of the selected data point within the set of logic and an instruction type corresponding to the location. Additionally and/or alternatively, references in the sub-tooltip 1430 can be made expandable to facilitate the display of more detailed information relating to said references. Expandable references can be denoted, for example, with an expansion button 1432. A user can engage an expansion button 1432 associated with a reference to display detailed information for the reference.

FIG. 14A illustrates a display state of a tooltip 1420 and sub-tooltip 1430 for a selected data point from a programming display 1410 prior to expansion of a reference in the sub-tooltip 1430. Sub-tooltip 1430 contains multiple references for the selected data point arranged in groups, and each reference includes an expansion button 1432 that indicates the availability of more detailed reference information.

FIG. 14B illustrates a display state of a tooltip 1420 and sub-tooltip 1430 after the expansion of a reference in the sub-tooltip 1430. More particularly, an expansion button 1434 corresponding to the topmost reference in the sub-tooltip 1430 is engaged in FIG. 14B. Once the expansion button 1434 is engaged, it can change in appearance from an expansion button 1432 corresponding to an unexpanded reference. Detailed information corresponding to the expanded reference can then be displayed in an additional sub-tooltip 1436.

In accordance with one aspect, the nature of detailed reference information displayed in an additional sub-tooltip 1436 can be adaptive to a programming scheme being utilized in the programming display 1410. By way of specific, non-limiting example, detailed reference information may be adaptively displayed based on a utilized programming scheme in one or more of the following ways. For example, if the programming display 1410 is employing a RLL programming scheme, detailed reference information provided by a sub-tooltip 1436 can include the type of a reference (e.g., whether the reference is a data point reference or a member reference), a link type for the reference (e.g., destructive or non-destructive), the location of the reference (e.g., rung number), and an instruction type for the reference. For example, detailed information provided in a sub-tooltip 1436 for a reference from a MyProgram/LadderInvocation routine given in sub-tooltip 1430 can appear as follows:

IO_Udt-*0(ExistingInstruction).

In the above example, IO_Udt denotes the data point to which the reference is directed. The number 0 indicates the rung at which the reference is located, and the asterisk in front of the rung number indicates that the reference is destructive. The information in parentheses following the rung number, ExistingInstruction, indicates the instruction type for the reference. Thus, the above example indicates that a data point IO_Udt is referenced in an element of type "ExistingInstruction" in Rung 0 in routine MyProgram/LadderInvocation, destructively.

In another example, if the programming display 1410 is employing a FBD programming scheme, detailed reference information for provided by a sub-tooltip 1436 can include the type of a reference, a link type for the reference, the location of the reference (e.g., a sheet number followed by a position in the sheet), an instruction type, and an element name for the reference. For example, detailed information provided in a sub-tooltip 1436 for a reference from a MyProgram/FBDInvocation routine given in sub-tooltip 1430 can appear as follows:

IO_Udt-*1-A1(ExistingInstruction,FBDInvocation).

The above example indicates that a data point IO_Udt is referenced in an element named "FBDInvocation" of type "ExistingInstruction," which is located in Area A1 of Sheet 1 of a routine named MyProgram/FBDInvocation, destructively.

In a further example, if the programming display 1410 is employing a SFC programming scheme, detailed reference information for provided by a sub-tooltip 1436 can include the type of a reference, a link type for the reference, the location of the reference (e.g., a position in a sheet followed by a line number), an instruction type, and the identity of a tag that references the selected data point. For example, detailed information provided in a sub-tooltip 1436 for a reference from a MyProgram/SFCInvocation routine given in sub-tooltip 1430 can appear as follows:

IO_Udt-*B1,Line15(Action,Action_000(Body)).

The above example indicates that a data point IO_Udt is referenced in a tag named "Action_000" of type "Action" in Area B1 of a routine named MyProgram/SFCInvocation, destructively. Additionally, the above example indicates that data point IO_Udt can be found in Line 15 in the body of Action_000.

As an additional example, if the programming display 1410 is employing a ST programming scheme, detailed reference information for provided by a sub-tooltip 1436 can include the type of a reference, a link type for the reference, and the location of the reference (e.g., a line number in a sheet). For example, detailed information provided in a sub-tooltip 1436 for a reference from a MyProgram/STInvocation routine given in sub-tooltip 1430 can appear as follows:

IO_Udt-Line 15.

The above example indicates that a data point IO_Udt is referenced in Line 15 of a routine named MyProgram/STInvocation, non-destructively.

Figure 15A:
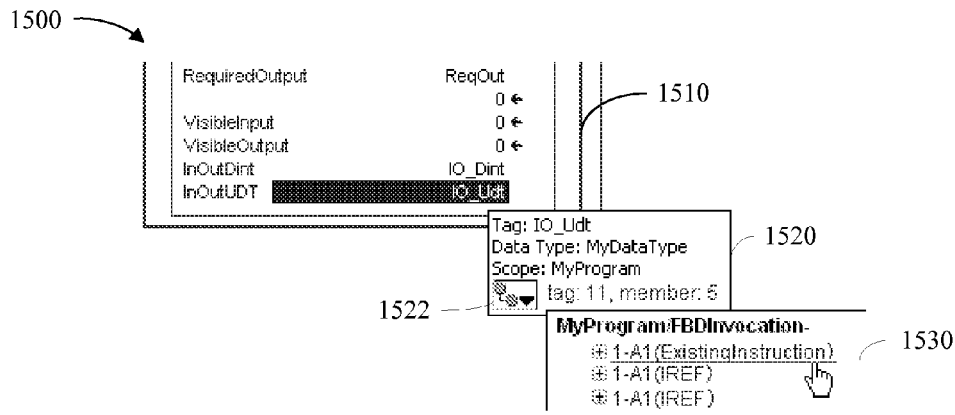
FIGS. 15A-B are additional illustrations of exemplary reference information for a data point that can be provided by an extended tooltip.
Figure 15B:
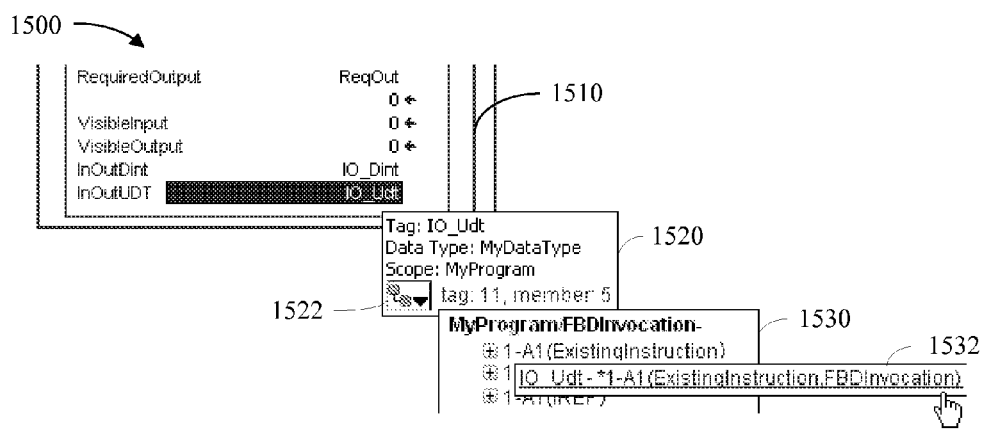

Turning to FIGS. 15A-B, additional functionality that can be provided by a software tool for logic programming via a tooltip 1520 and sub-tooltip 1530 for a selected data point is illustrated. As illustrated by both FIG. 15A and FIG. 15B, a tooltip 1520 corresponding to a selected data point from a programming display 1510 can be displayed (e.g., by a display component 230) at a display area 1500 with the programming display 1510. An expansion button 1522 located at the tooltip 1520 can then be engaged to display a sub-tooltip 1530 containing reference information for the selected data point at the display area 1500. As illustrated by FIG. 15B, a reference in the sub-tooltip can then be further expanded to facilitate the display of detailed reference information 1532.

In accordance with one aspect, references in the sub-tooltip 1530 and detailed references 1532 obtained by expanding references in the sub-tooltip 1530 can be made selectable by the software tool. Once a reference is selected by a user, the software tool can navigate the user to the location corresponding to the reference (e.g., via a navigation component 240). In one example, references in the sub-tooltip 1530 and detailed references 1532 can be hyperlinks. In a specific example illustrated by FIG. 15A and FIG. 15B, when a cursor is placed over a hyperlink reference, the cursor can change in appearance and an underline can be placed beneath the reference to indicate that the reference is selectable. A hyperlink reference can then be engaged by a mouse click or another appropriate action to select a reference and navigate a user to its location.

Figure 16:
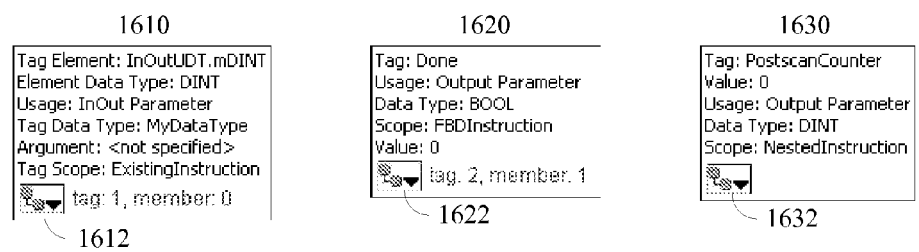
FIG. 16 illustrates exemplary expanded tooltips for a data point in accordance with various aspects described herein.

Turning now to FIG. 16, illustrations of exemplary expandable tooltips 1610, 1620, and 1630 for a data point in accordance with various aspects described herein are provided. In accordance with one aspect, expandable tooltips 1610, 1620, and/or 1630 can be provided by a software tool for logic programming in a common window area of display (e.g., a common window 310) with an add-on instruction (AOI) currently being programmed using the software tool. In the specific, non-limiting examples illustrated in FIG. 16, tooltip 1610 can display data point information relative to RLL programming and can include a name, usage, data type, value, and/or description of a data point. Further, tooltip 1620 can be displayed for a data point relative to FBD programming display and can include a name, usage, data type, routine scope, value, and/or description of the data point. In addition, tooltip 1630 can display information for a data point being utilized with ST programming and can include a name, value, usage, data type, routine scope, and/or description of the data point. In accordance with another aspect, the tooltips 1610, 1620, and 1630 can respectively include control regions in the form of buttons 1612, 1622, and 1632, which can be engaged to facilitate the display of reference information for a selected data point in a similar manner to the tooltips illustrated by FIGS. 13-14.

Figures 17C, 17D:
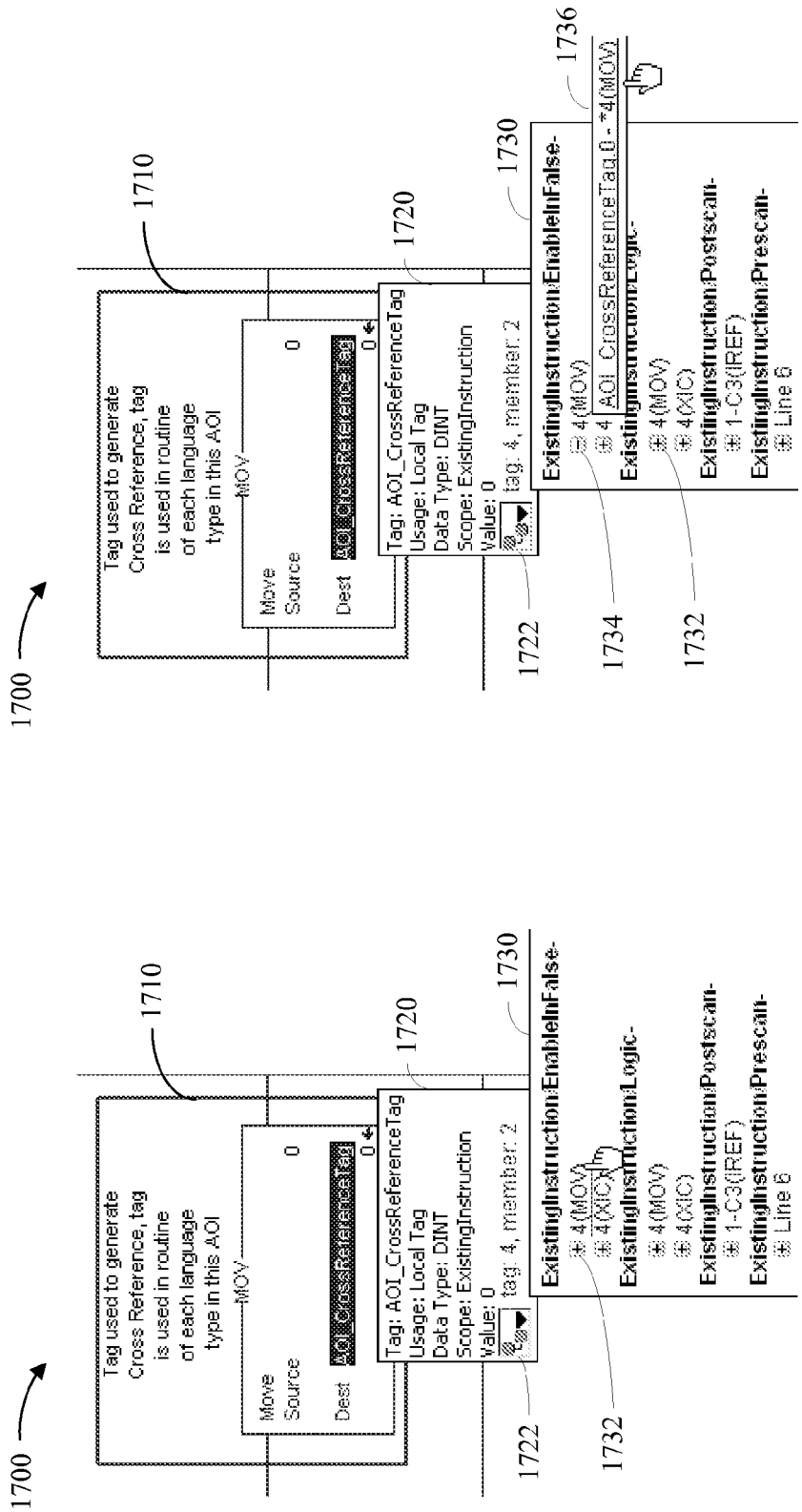

Referring to FIGS. 17A-D, additional exemplary reference tooltips 1720 that can be displayed by a software tool in accordance with aspects described herein are provided. As illustrated by FIG. 17A, an extendable tooltip 1720 can be provided and displayed in display area 1700 for a data point selected from an add-on instruction (AOI) display 1710. The tooltip 1720 can include an expansion button 1722 that can be engaged to display a sub-tooltip 1730 containing cross reference information for the selected data point. In one example, the cross reference information in the sub-tooltip 1730 can be displayed and arranged in a similar manner to the information provided in sub-tooltip 1430.

As further illustrated by FIG. 17A and FIG. 17B, references in the sub-tooltip 1730 can be made expandable by including expansion buttons 1732 for the respective references. When an expansion button 1732 is engaged, the appearance of the expansion button can change to that of expansion button 1734 to indicate that a corresponding reference has been expanded. Further, detailed information corresponding to the expanded reference can be displayed in an additional sub-tooltip 1736. In one example, detailed reference information provided by a sub-tooltips 1736 can be made adaptive to a programming scheme being utilized in the AOI display 1710 in a similar manner to the detailed reference information illustrated in FIG. 14B.

Accordingly, by way of non-limiting example, if the AOI display 1710 is employing a RLL programming scheme, detailed information provided in a sub-tooltip 1736 for a reference from an ExistingInstruction/EnableInFalse routine given in sub-tooltip 1730 can appear as follows:

AOI_CrossReferenceTag.0-*4(MOV).

In a similar manner to the detailed reference format utilized in sub-tooltip 1436, the above example indicates that bit 0 of a data point named "AOI_CrossReferenceTag" is referenced in an element of type "MOV" in Rung 4 in routine ExistingInstruction/EnableInFalse, destructively.

Similarly, for an AOI display 1710 employing a FBD programming scheme, detailed information provided in a sub-tooltip 1736 for a reference from an ExistingInstruction/Postscan routine given in sub-tooltip 1730 can appear as follows:

AOI_CrossReferenceTag-1-C3(IREF,AOI_CrossReferenceTag1), which, in a similar manner to the detailed reference format utilized in sub-tooltip 1436, indicates that a data point named "AOI_CrossReferenceTag" is referenced in a tag named "AOI_CrossReferenceTag1" of type "IREF" and is located in Area C3 of Sheet 1 in routine ExistingInstruction/Postscan, non-destructively.

Further, for an AOI display 1710 employing a ST programming scheme, detailed information provided in a sub-tooltip 1736 for a reference from an ExistingInstruction/Prescan routine given in sub-tooltip 1730 can appear as follows:

AOI_CrossReferenceTag-Line 6, which, in a similar manner to the detailed reference format utilized in sub-tooltip 1436, indicates that a data point named "AOI_CrossReferenceTag" is referenced in Line 6 of routine ExistingInstruction/Prescan, non-destructively.

In a further example illustrated by FIGS. 17C-D, references in a sub-tooltip 1730 and detailed references 1736 obtained by expanding references in the sub-tooltip 1730 can be made selectable by a software tool using one or more techniques illustrated by FIGS. 15A-B and/or substantially similar techniques. Once a reference is selected by a user, the software tool can navigate the user to the location corresponding to the reference. In one example, references in the sub-tooltip 1730 and detailed references 1732 can be hyperlinks, which can be substantially similar in function and appearance to the hyperlinks illustrated by FIGS. 15A-B.

Figures 18, 19:
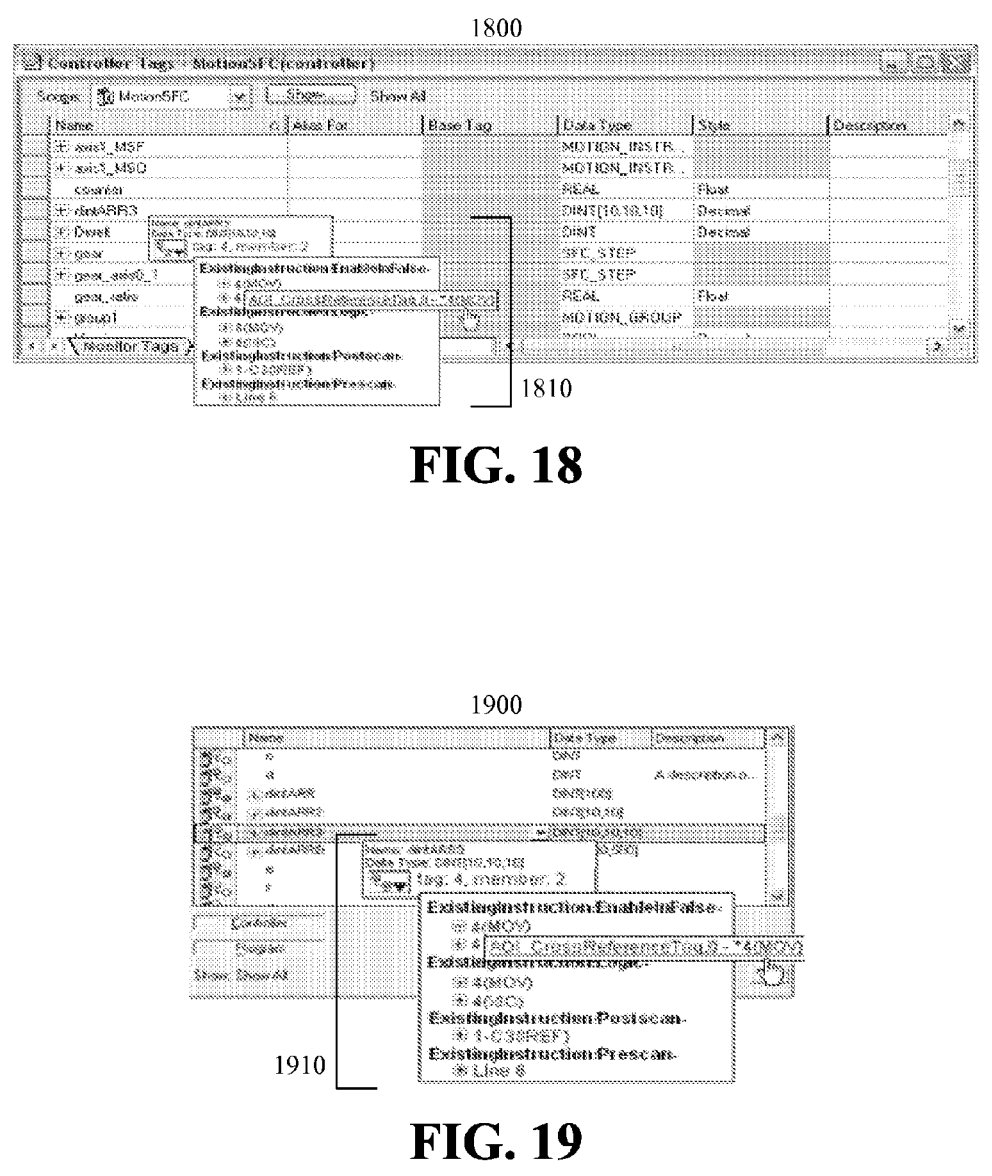

Turning briefly to FIG. 18, a user interface 1800 for editing data points in a software tool for logic programming is illustrated. In accordance with one aspect, the user interface 1800 can contain a list of data points within a set of logic from which a user can edit information associated with one or more of the data points. Further, a user can select a data point from the list provided by the user interface 1800 to display an expandable tooltip 1810 containing reference information for the selected data point. As illustrated by FIG. 18, the expandable tooltip 1810 can provide similar functionality and be substantially similar in appearance to one or more of the expandable tooltips illustrated in FIGS. 13-17.

Turning now briefly to FIG. 19, a user interface 1900 for browsing data points in a set of logic that can be provided by a software tool is illustrated. The user interface 1900 can include a list of data points within a set of logic to facilitate browsing of the data points by a user. In accordance with one aspect, a user can select a data point from the list provided by the user interface 1900 to display a tooltip 1910 containing information regarding the selected data point in a similar manner to tooltip 1302 illustrated by FIG. 12. In addition to the basic information provided by tooltip 1302, the tooltip 1910 can be made expandable to include cross reference information in a desired level of detail in a similar manner to the expandable tooltips illustrated in FIGS. 13-18. Further, as illustrated in FIG. 19, references in the expandable tooltip 1910 can be made selectable to, for example, facilitate navigation of the software tool to the location of a selected reference.

Figure 20A:
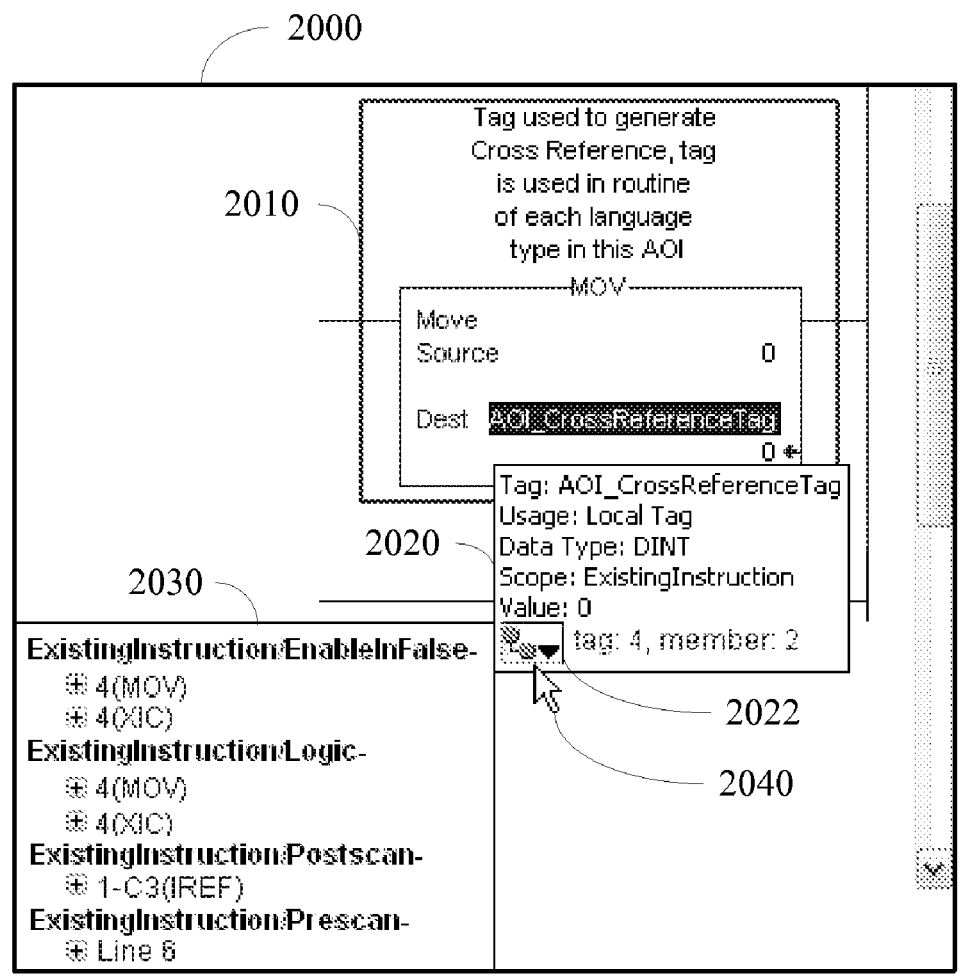
FIGS. 20A-B illustrate adaptive display of a tooltip for a data point within a set of logic in accordance with aspects described herein.
Figure 20B:
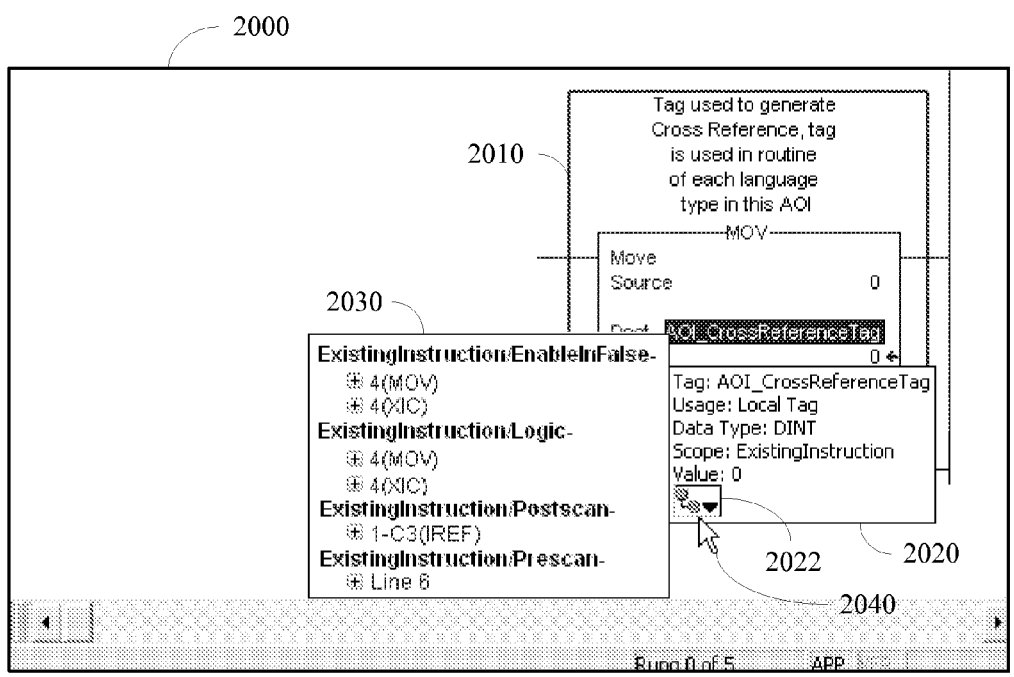

Referring to FIGS. 20A-B, adaptive display techniques that can be employed by a software tool for a tooltip 2020-2030 associated with a selected data point within a set of logic are illustrated. In one example, an expandable tooltip 2020 corresponding to a selected data point in an AOI display 2010 can be displayed in a common window 2000 with the AOI display 2010. The tooltip 2020 can additionally be expanded to include a sub-tooltip 2030 that contains reference information for the selected data point by engaging an expansion button 2022 at the tooltip 2020.

In accordance with one aspect, the tooltip 2020 and sub-tooltip 2030 can be displayed only when a cursor 2040 is located either at or within a predetermined distance of the tooltip 2020 and sub-tooltip 2030. Thus, the tooltip 2020 and sub-tooltip 2030 can be removed from the display window 2000 (e.g., by a display component 130) when the cursor 2040 is moved away from the boundaries of the tooltip 2020 and/or sub-tooltip 2030.

In accordance with another aspect, the tooltip 2020 and sub-tooltip 2030 can be displayed (e.g., by the display component 130) according to a default display arrangement. For example, the tooltip 2020 can be displayed below and to the right of the AOI display 2010 by default, and the sub-tooltip 2030 can be displayed below and to the right of the tooltip 2020 by default. Alternatively, if sufficient space does not exist in the display window 2000 for the default display arrangement, the tooltip 2020 and/or sub-tooltip 2030 can be displayed according to a modified arrangement. For example, FIG. 20A illustrates a scenario where sufficient display space does not exist at the right side of the display window 2000 for the default display arrangement of the sub-tooltip 2030. Accordingly, the display arrangement of the sub-tooltip 2030 is modified in FIG. 20A such that it is displayed to the left of the tooltip 2020. As another example, FIG. 20B illustrates a scenario where sufficient display space does not exist at the right side or the bottom of the display window 2000 for the default display arrangement of the sub-tooltip 2030. As illustrated in FIG. 20B, the sub-tooltip 2030 is instead displayed to the left of the tooltip 2020 such that the bottom of the sub-tooltip aligns with the bottom of the display area 2000.

Figure 21A:
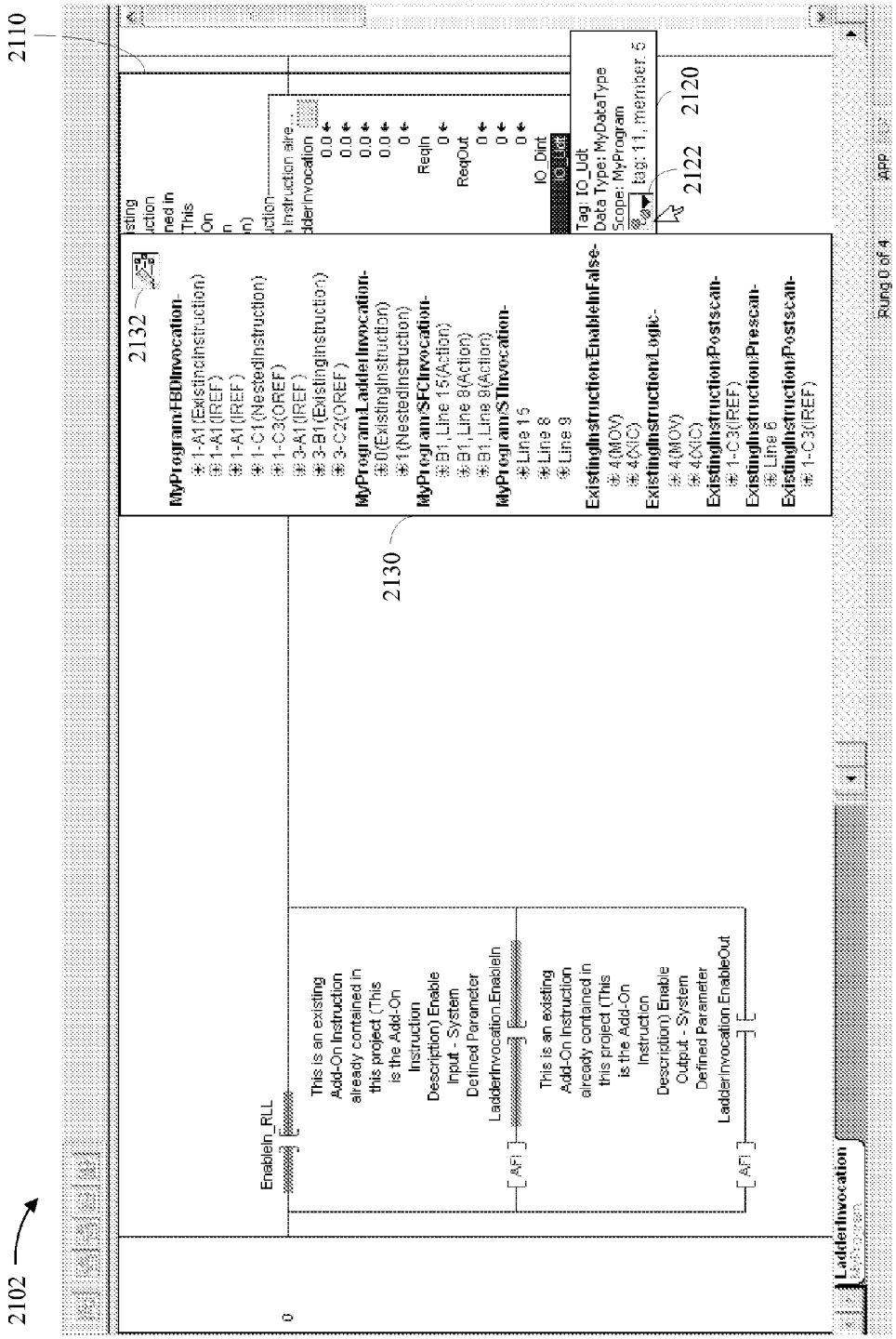
FIG. 21A illustrates adaptive display of a subset of available references for a data point based on available display area.

Turning to FIGS. 21A-B, an additional technique for adaptive display of a tooltip 2120 and sub-tooltip 2130 associated with a selected data point within a set of logic is illustrated. In one example, an expandable tooltip 2120 corresponding to a selected data point in a programming display 2110 can be displayed in a common window 2102 with the programming display 2110. The tooltip 2120 can then be expanded by engaging an expansion button 2122 to include a sub-tooltip 2130 that contains reference information for the selected data point. In accordance with one aspect, the tooltip 2120 and/or sub-tooltip 2130 can be adaptively displayed using one or more of the adaptive display techniques illustrated in FIGS. 20A-B. For example, as illustrated in FIG. 21A, sufficient display space does not exist at the display window 2102 below and to the right of the tooltip 2130 for display of the sub-tooltip 2130; accordingly, the sub-tooltip is displayed to the left of the tooltip 2120 such that the bottom edge of the sub-tooltip 2130 is aligned with the bottom of the display window 2102.

In accordance with another aspect, references associated with a selected data point may be too numerous for display in the window 2102. In the event that a selected data point has more references than what can be displayed in a sub-tooltip 2130 in the window 2102, a button 2132 or other suitable control region (e.g., a control region 738) can be provided at the sub-tooltip 2130. By clicking or otherwise engaging the button 2132, a user can be directed to an external cross-reference window, such as cross-reference window 2104 illustrated in FIG. 21B, for more complete reference information relative to the selected data point.

Figure 22:
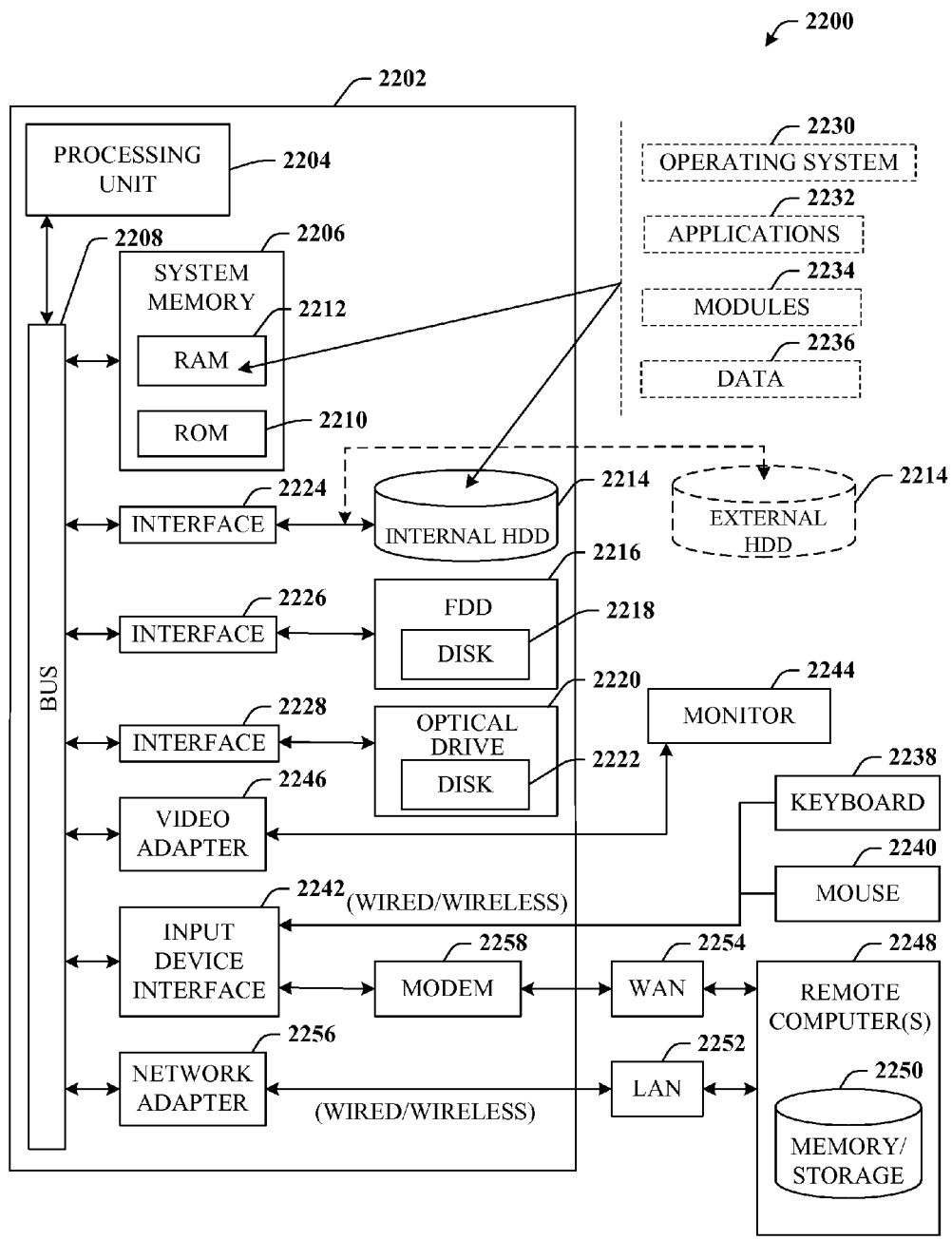
FIG. 22 is a diagram that illustrates an example operating environment in which claimed subject matter may function.

In order to provide additional context for various aspects described herein, FIG. 22 and the following discussion are intended to provide a brief, general description of a suitable computing environment 2200 in which various aspects of the claimed subject matter can be implemented. Additionally, while the above features have been described above in the general context of computer-executable instructions that may run on one or more computers, those skilled in the art will recognize that said features can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, micro-processor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 22, an exemplary environment 2200 for implementing various aspects described herein includes a computer 2202, the computer 2202 including a processing unit 2204, a system memory 2206 and a system bus 2208. The system bus 2208 couples to system components including, but not limited to, the system memory 2206 to the processing unit 2204. The processing unit 2204 can be any of various commercially available processors. Dual microprocessors and other multi-processor architectures may also be employed as the processing unit 2204.

The system bus 2208 can be any of several types of bus structure that may further interconnect to a memory bus (with or without a memory controller), a peripheral bus, and a local bus using any of a variety of commercially available bus architectures. The system memory 2206 includes read-only memory (ROM) 2210 and random access memory (RAM) 2212. A basic input/output system (BIOS) is stored in a non-volatile memory 2210 such as ROM, EPROM, EEPROM, which BIOS contains the basic routines that help to transfer information between elements within the computer 2202, such as during start-up. The RAM 2212 can also include a high-speed RAM such as static RAM for caching data.

The computer 2202 further includes an internal hard disk drive (HDD) 2214 (e.g., EIDE, SATA), which internal hard disk drive 2214 may also be configured for external use in a suitable chassis (not shown), a magnetic floppy disk drive (FDD) 2216, (e.g., to read from or write to a removable diskette 2218) and an optical disk drive 2220, (e.g., reading a CD-ROM disk 2222 or, to read from or write to other high capacity optical media such as the DVD). The hard disk drive 2214, magnetic disk drive 2216 and optical disk drive 2220 can be connected to the system bus 2208 by a hard disk drive interface 2224, a magnetic disk drive interface 2226 and an optical drive interface 2228, respectively. The interface 2224 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 2202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. It is appreciated that the claimed subject matter can be implemented with various commercially available operating systems or combinations of operating systems.

A user can enter commands and information into the computer 2202 through one or more wired/wireless input devices, e.g., a keyboard 2238 and a pointing device, such as a mouse 2240. Other input devices (not shown) may include a microphone, an IR remote control, a joystick, a game pad, a stylus pen, touch screen, or the like. These and other input devices are often connected to the processing unit 2204 through an input device interface 2242 that is coupled to the system bus 2208, but can be connected by other interfaces, such as a parallel port, a serial port, an IEEE-1394 port, a game port, a USB port, an IR interface, etc.

A monitor 2244 or other type of display device is also connected to the system bus 2208 via an interface, such as a video adapter 2246. In addition to the monitor 2244, a computer typically includes other peripheral output devices (not shown), such as speakers, printers, etc.

The computer 2202 may operate in a networked environment using logical connections via wired and/or wireless communications to one or more remote computers, such as a remote computer(s) 2248. The remote computer(s) 2248 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2250 is illustrated. The logical connections depicted include wired/wireless connectivity to a local area network (LAN) 2252 and/or larger networks, e.g., a wide area network (WAN) 2254. Such LAN and WAN networking environments are commonplace in offices and companies, and facilitate enterprise-wide computer networks, such as intranets, all of which may connect to a global communications network, e.g., the Internet.

When used in a LAN networking environment, the computer 2202 is connected to the local network 2252 through a wired and/or wireless communication network interface or adapter 2256. The adapter 2256 may facilitate wired or wireless communication to the LAN 2252, which may also include a wireless access point disposed thereon for communicating with the wireless adapter 2256.

When used in a WAN networking environment, the computer 2202 can include a modem 2258, or is connected to a communications server on the WAN 2254, or has other means for establishing communications over the WAN 2254, such as by way of the Internet. The modem 2258, which can be internal or external and a wired or wireless device, is connected to the system bus 2208 via the serial port interface 2242. In a networked environment, program modules depicted relative to the computer 2202, or portions thereof, can be stored in the remote memory/storage device 2250. It will be appreciated that the network connections shown are exemplary and other means of establishing a communications link between the computers can be used.

The computer 2202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at a 12 Mbps (802.11a) or 54 Mbps (802.11b) data rate, for example, or with products that contain both bands (dual band). Thus, networks using Wi-Fi wireless technology can provide real-world performance similar to a 10BaseT wired Ethernet network.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates viewing locations of a data point, comprising:
   one or more processors;
   a memory communicatively coupled to the one or more processors, the memory having stored thereon computer-executable components to implement the system, including:
      a locate component configured to determine one or more locations of a data point within a control program in response to selection of the data point; and
      a display component configured to display an information structure that contains information relating to the data point in response to the selection of the data point, wherein:
         the information structure includes a first control region configured to trigger display of a location structure that displays the one or more locations of the data point in response to selection of the first control region,
         at least a portion of the location structure is superimposed over at least a portion of the control program within a common window of display,
         at least one location of the one or more locations displayed in the location structure includes a second control region, and
         the display component is further configured to display information about the at least one location in response to selection of the second control region.

2. The system of claim 1, wherein the information relating to the data point contained in the information structure includes at least one of a data type of the data point, a program scope of the data point, or a description of the data point.

3. The system of claim 1, wherein at least one of the information structure or the location structure is removed from display in response to a cursor being moved a distance from the information structure or the location structure greater than a predetermined distance.

4. The system of claim 1, wherein the display component is further configured to determine whether sufficient available display space exists within the common window of display to display at least one of the information structure or the location structure according to a default arrangement, and to display the at least one of the information structure or the location structure according to a non-default arrangement in response to a negative determination.

5. The system of claim 4, wherein the display component is further configured to determine whether sufficient available display space exists within the common window of display to list the one or more locations of the data point, wherein the first control region is further configured to at least one of navigate to an external reference window or scroll through the one or more locations of the data point within the location structure in response to a negative determination.

6. The system of claim 1, further comprising a navigation component configured to receive an indication of a selected location of the one or more locations of the data point via the location structure and to navigate to the selected location within the control program.

7. The system of claim 6, wherein at least one location of the one or more locations of the data point is represented by a hyperlink that effects navigation to the at least one location within the control program.

8. The system of claim 1, wherein the display component is further configured to display the location structure in response to a cursor moving within a predetermined distance from the data point.

9. A method that facilitates viewing locations of a data point within a control program, comprising:
   determining at least one location of a data point within a control program;
   superimposing an information structure over at least a first portion of the control program in response to the data point being selected, the information structure including an expansion control;
   displaying information relating to the data point within the information structure;
   superimposing a location structure over at least a second portion of the control program in response to selection of the expansion control;
   displaying at least one hyperlink corresponding to the at least one location of the data point in the location structure; and
   navigating to the at least one location within the control program in response to selection of the at least one hyperlink.

10. The method of claim 9, wherein the superimposing the location structure includes:
    displaying at least one reference within the location structure corresponding to the at least one location of the data point within the control program, the at least one reference comprising a respective at least one control region; and
    displaying information corresponding to the at least one reference in response to engagement of the at least one control region.

11. The method of claim 9, wherein the displaying the at least one hyperlink includes:
    assessing available area within a window of display, containing the control program, for displaying the at least one location; and
    displaying the at least one hyperlink at a position within the window of display selected based at least in part on the assessing.

12. The method of claim 11, wherein the assessing the available area within the window of display includes determining whether sufficient available area exists within the window of display for displaying the at least one hyperlink, and the displaying the at least one hyperlink includes displaying a control region that causes navigation to a reference window external to the window of display in response to a negative determination.

13. The method of claim 9, wherein the control program is control logic for an industrial automation system.

14. A computer-readable storage medium having stored thereon computer-executable instructions that, in response to execution, cause a computer system to perform operations, including:
    determining at least one location of a data point within a control program;
    overlaying a first display graphic on at least a first portion of the control program in a display window in response to selecting the data point, the first display graphic having a control area;
    rendering information relating to the data point within the first display graphic;

overlaying a second display graphic over at least a second portion of the control program in the display window in response to receiving a selection of the control area;

rendering at least one link corresponding to the at least one location of the data point in the second display graphic; and navigating to the at least one location of the data point within the control program in response to selection of the at least one link.

15. A system that facilitates viewing locations of a data point within displayed logic, comprising:

means for identifying one or more locations of a data point within a set of logic displayed in a display area;

means for superimposing, in response to selection of the data point, a first graphic window containing information relating to the data point over at least a first portion of the logic within the display area;

means for superimposing, in response to selection of a first control element within the first graphic window, a second graphic window containing the one or more locations of the data point over at least a second portion of the logic within the display area, at least one location of the one or more locations contained in the second graphic window including a second control element; and means for displaying information about the at least one location in response to selection of the second control element.

16. The system of claim 15, further comprising means for navigating to a location of the data point within the set of logic corresponding to a selected location displayed in the second graphic window.

* * * * *